(12) United States Patent
Zhao et al.

(10) Patent No.: US 10,609,367 B2
(45) Date of Patent: Mar. 31, 2020

(54) LOW-COMPLEXITY SIGN PREDICTION FOR VIDEO CODING

(71) Applicant: QUALCOMM Incorporated, San Diego, CA (US)

(72) Inventors: Xin Zhao, San Diego, CA (US); Vadim Seregin, San Diego, CA (US); Li Zhang, San Diego, CA (US); Marta Karczewicz, San Diego, CA (US); Amir Said, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 15/848,759

(22) Filed: Dec. 20, 2017

(65) Prior Publication Data

US 2018/0176556 A1 Jun. 21, 2018

Related U.S. Application Data

(60) Provisional application No. 62/437,642, filed on Dec. 21, 2016, provisional application No. 62/476,375, (Continued)

(51) Int. Cl.
*H04N 19/105* (2014.01)
*H04N 19/122* (2014.01)
(Continued)

(52) U.S. Cl.
CPC ......... *H04N 19/105* (2014.11); *H04N 19/122* (2014.11); *H04N 19/124* (2014.11);
(Continued)

(58) Field of Classification Search
None
See application file for complete search history.

(56) References Cited

U.S. PATENT DOCUMENTS 7,356,477 B1    4/2008   Allan et al.
8,160,374 B2 *   4/2012   Zheng .................. H04N 19/139
                                                   382/239

(Continued)

FOREIGN PATENT DOCUMENTS

WO    2012175196 A1    12/2012
WO    2013075318 A1    5/2013

OTHER PUBLICATIONS

Henry et al., "Residual Coefficient Sign Prediction", ITU-T SG 16 WG 3 and ISO/IEC JTC 1/SC29/WG 11, Oct. 15-21, 2016, Document JVET-D0031, pp. 1-6. (Year: 2016).*

(Continued)

*Primary Examiner* — Reza Aghevli
(74) *Attorney, Agent, or Firm* — Shumaker & Sieffert, P.A.

(57) ABSTRACT

A device includes processing circuitry configured to identify a set of pre-stored residual samples in video data that is stored to a memory, to combine the set of stored residual samples to form a combination, to apply a first sign combination to transform coefficients of the combination to obtain a first hypothesis reconstruction for a current block of the video data, and to apply a second sign combination to the transform coefficients of the combination to obtain a second hypothesis reconstruction for the current block. The processing circuitry is further configured to derive respective cost functions with respect to the first and second hypothesis reconstructions, to compare the respective derived cost functions, to select, based on the comparison, either the first or second hypothesis reconstruction, and to code the current block using a sign prediction associated with the selected one of the first or second hypothesis reconstruction.

24 Claims, 13 Drawing Sheets

Related U.S. Application Data filed on Mar. 24, 2017, provisional application No. 62/549,336, filed on Aug. 23, 2017.

(51) Int. Cl.

| | | |
|---|---|---|
| *H04N 19/124* | (2014.01) | |
| *H04N 19/126* | (2014.01) | |
| *H04N 19/129* | (2014.01) | |
| *H04N 19/13* | (2014.01) | |
| *H04N 19/136* | (2014.01) | |
| *H04N 19/176* | (2014.01) | |
| *H04N 19/18* | (2014.01) | |
| *H04N 19/184* | (2014.01) | |
| *H04N 19/51* | (2014.01) | |
| *H04N 19/593* | (2014.01) | |
| *H04N 19/61* | (2014.01) | |

(52) U.S. Cl.
CPC ......... *H04N 19/126* (2014.11); *H04N 19/129* (2014.11); *H04N 19/13* (2014.11); *H04N 19/136* (2014.11); *H04N 19/176* (2014.11); *H04N 19/18* (2014.11); *H04N 19/184* (2014.11); *H04N 19/51* (2014.11); *H04N 19/593* (2014.11); *H04N 19/619* (2014.11)

(56) References Cited

U.S. PATENT DOCUMENTS

| | | | | |
|---|---|---|---|---|
| 8,625,917 | B2* | 1/2014 | Zheng | H04N 19/139 |
| | | | | 382/239 |
| 9,277,215 | B2* | 3/2016 | Zheng | H04N 19/139 |
| 9,369,708 | B2 | 6/2016 | Zhang et al. | |
| 9,516,306 | B2 | 12/2016 | Zhang et al. | |
| 2009/0010557 | A1* | 1/2009 | Zheng | H04N 19/139 |
| | | | | 382/239 |
| 2009/0067503 | A1* | 3/2009 | Jeong | H04N 19/91 |
| | | | | 375/240.16 |
| 2012/0170859 | A1* | 7/2012 | Zheng | H04N 19/139 |
| | | | | 382/238 |
| 2013/0044808 | A1 | 2/2013 | Nakagawa et al. | |
| 2014/0086313 | A1* | 3/2014 | Zheng | H04N 19/139 |
| | | | | 375/240.03 |
| 2014/0341305 | A1* | 11/2014 | Qu | H04N 19/70 |
| | | | | 375/240.26 |
| 2014/0348223 | A1 | 11/2014 | Henry et al. | |
| 2014/0355679 | A1* | 12/2014 | Rosewarne | H04N 19/11 |
| | | | | 375/240.12 |
| 2014/0362926 | A1* | 12/2014 | Rosewarne | H04N 19/11 |
| | | | | 375/240.18 |
| 2015/0003514 | A1 | 1/2015 | Hsu et al. | |
| 2015/0043641 | A1* | 2/2015 | Gamei | H04N 19/157 |
| | | | | 375/240.12 |
| 2015/0103918 | A1 | 4/2015 | Wang et al. | |
| 2015/0249828 | A1* | 9/2015 | Rosewarne | H04N 19/119 |
| | | | | 375/240.02 |
| 2015/0358621 | A1 | 12/2015 | He et al. | |
| 2016/0295238 | A1 | 10/2016 | Henry et al. | |
| 2017/0142444 | A1 | 5/2017 | Henry et al. | |
| 2017/0155903 | A1* | 6/2017 | Rosewarne | H04N 19/124 |
| 2018/0084284 | A1* | 3/2018 | Rosewarne | H04N 19/124 |
| 2018/0176563 | A1* | 6/2018 | Zhao | H04N 19/126 |
| 2018/0220159 | A1 | 8/2018 | Won et al. | |

OTHER PUBLICATIONS

Kazui et al., "Description of video coding technology proposal by FUJITSU", ITU-T SG16 WP3 and ISO/IEC JTC1/SC29/WG11, Apr. 15-23, 2010, Document JCTVC-A115, pp. 1-23. (Year: 2010).*
Koyama et al., "Coefficient Sign Bit Compression in Video Coding", Proc. of IEEE 2012 Picture Coding Symposium (PCS 2012), May 7-9, 2012, pp. 385-388. (Year: 2012).*

Kazui (Fujitsu) K., et al., "Description of video coding technology proposal by FUJITSU," 1. JCT-VC Meeting; Apr. 15, 2010-Apr. 23, 2010; Dresden, DE (Joint Collaborative Team on Video Coding of ISO/IEC JTC1/SC29/WG11 and ITU-TSG.16); No. JCTVC-A115, Apr. 12, 2010 (Apr. 12, 2010), XP030007555, pp. 1-23, URL: http://wftp3.itu.int/av-arch/jctvc-site/.
Lainema J., et al., "Intra Coding of the HEVC Standard," IEEE Transactions on Circuits and Systems for Video Technology, Institute of Electrical and Electronics Engineers, USA, vol. 22, No. 12, Dec. 1, 2012 (Dec. 1, 2012), XP011487148, pp. 1792-1801.
Sole J., et al., "Transform Coefficient Coding in HEVC," IEEE Transactions on Circuits and Systems for Video Technology, IEEE Service Center, Piscataway, NJ, US, vol. 22, No. 12, Dec. 1, 2012 (Dec. 1, 2012), pp. 1765-1777, XP011487805.
ITU-T H.265, Series H: Audiovisual and Multimedia Systems, Infrastructure of audiovisual services—Coding of moving video, Advanced video coding for generic audiovisual services, The International Telecommunication Union, Apr. 2015, 634 pp.
Wang Y-K. et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.
Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, San Diego, USA, Document No. JVET-B1001_v1, Feb. 20-26, 2016, 31 pp.
Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.
Sullivan G.J., et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.
Wien, "High Efficiency Video Coding," Coding Tools and specification, Chapter 5, Sep. 30, 2014, pp. 133-160.
H.264 Prediction; "Chapter 6" In:Iain E Richardson: "The H.264 Advanced Video Compression Standard, Second Edition," Apr. 20, 2010 (Apr. 20, 2010), Wiley, XP030001637, ISBN: 978-0-470-51692-8 pp. 137-177.
Koyama et al., "Coefficient Sign Bit Compression in Video Coding," May 7-9, 2012, 2012 Picture Coding Symposium, pp. 385-388.
Zhang et al., "Context-based Arithmetic Coding Reexamined for DCT Video Compression," 2007 IEEE, pp. 3147-3150.
Wu et al., "High-Order Context Modeling and Embedded Conditional Entropy Coding of Wavelet Coefficients for Image Compression," 1998 IEEE, pp. 1378-1382.
Said et al., "Measuring the Strength of Partial Encryption Schemes," 2005 IEEE, 4 pp.
Ponomarenko et al., "Prediction of signs of DCT coefficients in block-based lossy image compression," Proceedings of SPIE, Electronic Imaging 2007, Feb. 27, 2007, 8 pp.
Deever et al., "What's Your Sign? Efficient Sign Coding for Embedded Wavelet Image Coding," 10 pp.
Henry F., et al., "Residual Coefficient Sign Prediction," 4th JVET Meeting; Oct. 15, 2016-Oct. 21, 2016; Chengdu, CN (The Joint Video Exploration Team of ISO/IEC JTC1/SC29/WG11 and ITU-T SG.16); URL: http://phenix.int-evry.fr/jvet/, No. JVET-D0031-v4, Oct. 20, 2016 (Oct. 20, 2016), XP030150258, 6 pp.
Partial International Search Report—PCT/US2017/067900—ISA/EPO—dated Mar. 1, 2018, 14 pp.
U.S. Appl. No. 15/848,803, filed by Xin Zhao et al, filed Dec. 20, 2017.
U.S. Appl. No. 15/848,862, filed by Xin Zhao et al., filed Dec. 20, 2017.
International Search Report and Written Opinion—PCT/US2017/067900—ISA/EPO—dated Apr. 26, 2018.

(56) References Cited

OTHER PUBLICATIONS

Chen et al., "Description of SDR, HDR and 360 degree video coding technology proposal by Qualcomm and Technicolor-low and high complexity versions," JVET Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, No. JVET-J0021, 43 pp.

Segall, et al., "Joint Call for Proposal on Video Compression with Capability beyond HEVC," JVET Meeting; Macao, CN, Oct. 18-24, 2017, (The Joint Video Exploration Team of ISO/IEC JTC1/SC29/WG11 and ITU-T SG.16); URL: http://phenix.int-evry.fr/jvet/, No. JVET-H1002, version 6, Nov. 8, 2017, 27 pp.

Bossen et al., "JEM Software Manual," Joint Collaborative Team on Video coding (JCT-VC) of ITU-T SG16 WP3 and ISO/IEC JTC1/SC29/WG11, document: JCIVC-Software Manual, Aug. 3, 2016, 29 pp.

Bossen et al., "HM Software Manual," Joint Collaborative Team on Video coding (JCT-VC) of ITU-T SG16 WP3 and ISO/IEC JTC1/SC29/WG11, document: JCTVC-Software-Manual, Aug. 7, 2017, 31 pp.

He, et al., "360Lib Software Manual," Joint Collaborative Team on Video coding (JCT-VC) of ITU-T SG16 WP3 and ISO/IEC JTC1/SC29/WG11, document: JVET-360Lib, Software Manual, Nov. 1, 2017, 26 pp.

"CMake," accessed on Apr. 2, 2018, accessed from https://cmake.org/, 7 pp.

"ClangFormat," accessed on Apr. 2, 2018, accessed from https://clang.llvm.org/docs/ClangFormat.html , 4 pp.

International Preliminary Report on Patentability—PCT/US2017/067900, The International Bureau of WIPO—Geneva, Switzerland, dated Jul. 4, 2019, 12 pp.

\* cited by examiner $$cost = \sum_{x=0}^{w-1} |\underbrace{(2p_{x,\_1} - p_{x,\_2})}_{\text{prediction}} - \underbrace{p_{x,0}}_{\substack{\text{hypothesis} \\ \text{reconstruction}}}|$$

$$+ \sum_{y=0}^{h-1} |(2p_{\_1,y} - p_{\_2,y}) - p_{0,y}|$$

FIG. 3B

NEW EXAMPLES

EXAMPLE OF EXISTING TECHNOLOGY

LOW-COMPLEXITY SIGN PREDICTION FOR VIDEO CODING

This application claims the benefit of:
U.S. Provisional Application No. 62/437,642, filed on 21 Dec. 2016;
U.S. Provisional Application No. 62/476,375, filed on 24 Mar. 2017; and
U.S. Provisional Application No. 62/549,336, filed on 23 Aug. 2017, the entire contents of each of which are incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques. Video coding standards include ITU-T H.261, ISO/IEC MPEG-1 Visual, ITU-T H.262 or ISO/IEC MPEG-2 Visual ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

In an example, this disclosure is directed to a method of coding video data. The method includes identifying a set of pre-stored residual samples in a pre-stored portion of the video data, combining the set of pre-stored residual samples to form a combination of pre-stored residual samples, applying a first sign combination to transform coefficients of the combination of pre-stored residual samples to obtain a first hypothesis reconstruction with respect to a current block of the video data, and applying a second sign combination to the transform coefficients of the combination of pre-stored residual samples to obtain a second hypothesis reconstruction with respect to the current block of the video data. The method further includes deriving respective cost functions with respect to the first hypothesis reconstruction and the second hypothesis reconstruction, comparing the respective derived cost functions, selecting, based on the comparison, either the first hypothesis reconstruction or the second hypothesis reconstruction, and coding the current block using a sign prediction associated with the selected one of the first hypothesis reconstruction or the second hypothesis reconstruction.

In another example, this disclosure is directed to a device for coding data. The device includes a video data memory, and processing circuitry coupled to the video data memory. The processing circuitry is configured to identify a set of pre-stored residual samples in a portion of the video data that is pre-stored to the video data memory, to combine the set of pre-stored residual samples to form a combination of pre-stored residual samples, to apply a first sign combination to transform coefficients of the combination of pre-stored residual samples to obtain a first hypothesis reconstruction with respect to a current block of the video data, and to apply a second sign combination to the transform coefficients of the combination of pre-stored residual samples to obtain a second hypothesis reconstruction with respect to the current block of the video data. The processing circuitry is further configured to derive respective cost functions with respect to the first hypothesis reconstruction and the second hypothesis reconstruction, to compare the respective derived cost functions, to select, based on the comparison, either the first hypothesis reconstruction or the second hypothesis reconstruction, and to code the current block using a sign prediction associated with the selected one of the first hypothesis reconstruction or the second hypothesis reconstruction.

In another example, this disclosure is directed to an apparatus for coding video data. The apparatus includes means for identifying a set of pre-stored residual samples in a pre-stored portion of the video data, means for combining the set of pre-stored residual samples to form a combination of pre-stored residual samples, means for applying a first sign combination to transform coefficients of the combination of pre-stored residual samples to obtain a first hypothesis reconstruction with respect to a current block of the video data, and means for applying a second sign combination to the transform coefficients of the combination of pre-stored residual samples to obtain a second hypothesis reconstruction with respect to the current block of the video data. The apparatus further includes means for deriving respective cost functions with respect to the first hypothesis reconstruction and the second hypothesis reconstruction, means for comparing the respective derived cost functions, means for selecting, based on the comparison, either the first hypothesis reconstruction or the second hypothesis reconstruction, and means for coding the current block using a sign prediction associated with the selected one of the first hypothesis reconstruction or the second hypothesis reconstruction.

In another example, this disclosure is directed to a non-transitory computer-readable medium encoded with instructions that, when executed, cause one or more processors of a device to identify a set of pre-stored residual samples in a portion of the video data that is pre-stored to the non-transitory computer-readable storage medium, to combine the set of pre-stored residual samples to form a combination of pre-stored residual samples, to apply a first sign combination to transform coefficients of the combination of pre-stored residual samples to obtain a first hypothesis reconstruction with respect to a current block of the video data, and to apply a second sign combination to the transform coefficients of the combination of pre-stored residual samples to obtain a second hypothesis reconstruction with respect to the current block of the video data. The instructions, when executed, further cause the one or more processors to derive respective cost functions with respect to the first hypothesis reconstruction and the second hypothesis reconstruction, to compare the respective derived cost functions, to select, based on the comparison, either the first hypothesis reconstruction or the second hypothesis reconstruction, and to code the current block using a sign prediction associated with the selected one of the first hypothesis reconstruction or the second hypothesis reconstruction.

In another example, this disclosure is directed to a method of coding video data. The method includes determining that a block of the video data is eligible to be coded using sign prediction, performing the sign prediction with respect to one or more transform coefficients of the block only if the block meets a predetermined criterion, where the predetermined criterion is based on at least one of: a width of the block, a height of the block, a coding mode used to code the block, or a position of one or more sign-predicted transform coefficients within the block, and coding the block based on the sign prediction performed with respect to the block.

In another example, this disclosure is directed to a device for coding data. The device includes a memory configured to store video data, and processing circuitry coupled to the memory. The processing circuitry is configured to determine that a block of the video data stored to the memory is eligible to be coded using sign prediction, to perform the sign prediction with respect to one or more transform coefficients of the block only if the block meets a predetermined criterion, where the predetermined criterion is based on at least one of: a width of the block, a height of the block, a coding mode used to code the block, or a position of one or more sign-predicted transform coefficients within the block, and to code the block based on the sign prediction performed with respect to the block.

In another example, this disclosure is directed to an apparatus for coding video data. The apparatus includes means for determining that a block of video data is eligible to be coded using sign prediction, means for performing the sign prediction with respect to one or more transform coefficients of the block only if the block meets a predetermined criterion, where the predetermined criterion is based on at least one of: a width of the block, a height of the block, a coding mode used to code the block, or a position of one or more sign-predicted transform coefficients within the block, and means for coding the block based on the sign prediction performed with respect to the block.

In another example, this disclosure is directed to a non-transitory computer-readable medium that is encoded with instructions. The instructions, when executed, cause one or more processors of a device to determine that a block of video data stored to the non-transitory computer-readable storage medium is eligible to be coded using sign prediction, to perform the sign prediction with respect to one or more transform coefficients of the block only if the block meets a predetermined criterion, wherein the predetermined criterion is based on at least one of: a width of the block, a height of the block, a coding mode used to code the block, or a position of one or more sign-predicted transform coefficients within the block, and to code the block based on the sign prediction performed with respect to the block.

In an example, this disclosure is directed to a method of coding video data. The method includes applying a first sign combination to transform coefficients of a block of the video data to obtain a first hypothesis reconstruction with respect to the block of the video data, applying a second sign combination to the transform coefficients of the block of the video data to obtain a second hypothesis reconstruction with respect to the block of the video data, measuring a first cost function with respect to the first hypothesis reconstruction by determining a first set of pixel value gradients that represent respective differences between samples of the first hypothesis reconstruction of the block and samples of a neighboring block that is positioned adjacent to the block, and measuring a second cost function with respect to the second hypothesis reconstruction by determining a second set of pixel value gradients that represent respective differences between samples of the second hypothesis reconstruction of the block and samples of the neighboring block that is positioned adjacent to the block. The method further includes comparing the first cost function to the second cost function, selecting, based on the comparison, either the first hypothesis reconstruction or the second hypothesis reconstruction, and coding the block using the respective sign combination associated with the selected one of the first hypothesis reconstruction or the second hypothesis reconstruction.

In another example, this disclosure is directed to a device for coding data. The device includes a memory configured to store video data, and processing circuitry in communication with the memory. The processing circuitry is configured to apply a first sign combination to transform coefficients of a block of the video data stored to the memory to obtain a first hypothesis reconstruction with respect to the block of the video data, to apply a second sign combination to the transform coefficients of the block of the video data stored to the memory to obtain a second hypothesis reconstruction with respect to the block of the video data, to measure a first cost function with respect to the first hypothesis reconstruction by determining a first set of pixel value gradients that represent respective differences between samples of the first hypothesis reconstruction of the block and samples of a neighboring block that is positioned adjacent to the block, and to measure a second cost function with respect to the second hypothesis reconstruction by determining a second set of pixel value gradients that represent respective differences between samples of the second hypothesis reconstruction of the block and samples of the neighboring block that is positioned adjacent to the block. The processing circuitry is further configured to compare the first cost function to the second cost function, to select, based on the comparison, either the first hypothesis reconstruction or the second hypothesis reconstruction, and to code the block using the respective sign combination associated with the selected one of the first hypothesis reconstruction or the second hypothesis reconstruction.

In another example, this disclosure is directed to an apparatus for coding video data. The apparatus includes means for applying a first sign combination to transform coefficients of a block of video data to obtain a first hypothesis reconstruction with respect to the block of the video data, means for applying a second sign combination to the transform coefficients of the block of the video data to obtain a second hypothesis reconstruction with respect to the block of the video data, means for measuring a first cost function with respect to the first hypothesis reconstruction by determining a first set of pixel value gradients that represent respective differences between samples of the first hypothesis reconstruction of the block and samples of a neighboring block that is positioned adjacent to the block, and means for measuring a second cost function with respect to the second hypothesis reconstruction by determining a second set of pixel value gradients that represent respective differences between samples of the second hypothesis reconstruction of the block and samples of the neighboring block that is positioned adjacent to the block. The apparatus further includes means for comparing the first cost function to the second cost function, means for selecting, based on the comparison, either the first hypothesis reconstruction or the second hypothesis reconstruction; and means for coding the block using the respective sign combination associated with the selected one of the first hypothesis reconstruction or the second hypothesis reconstruction.

In another example, this disclosure is directed to a non-transitory computer-readable medium encoded with instructions. The instructions, when executed, cause one or more processors of a video coding device to apply a first sign combination to transform coefficients of a block of e video data stored to the non-transitory computer-readable storage medium to obtain a first hypothesis reconstruction with respect to the block of the video data, to apply a second sign combination to the transform coefficients of the block of the video data stored to the non-transitory computer-readable storage medium to obtain a second hypothesis reconstruction with respect to the block of the video data, to measure a first cost function with respect to the first hypothesis reconstruction by determining a first set of pixel value gradients that represent respective differences between samples of the first hypothesis reconstruction of the block and samples of a neighboring block that is positioned adjacent to the block, and to measure a second cost function with respect to the second hypothesis reconstruction by determining a second set of pixel value gradients that represent respective differences between samples of the second hypothesis reconstruction of the block and samples of the neighboring block that is positioned adjacent to the block. The instructions, when executed, further cause the one or more processors of the video coding device to compare the first cost function to the second cost function, to select, based on the comparison, either the first hypothesis reconstruction or the second hypothesis reconstruction, and to code the block using the respective sign combination associated with the selected one of the first hypothesis reconstruction or the second hypothesis reconstruction.

The details of one or more examples of the disclosure are set forth in the accompanying drawings and the description below. Other features, objects, and advantages will be apparent from the description, drawings, and the claims.

BRIEF DESCRIPTION OF DRAWINGS

FIGS. 3A and 3B are diagrams illustrating hypothesis reconstruction and prediction techniques.

DETAILED DESCRIPTION

This disclosure is related to techniques for transform coefficient sign bit prediction for video encoding and decoding, as applied for Intra or Inter coded blocks, as well as blocks coded in other modes. Aspects of this disclosure may be used in the context of advanced video codecs, such as extensions of HEVC or the next generation of video coding standards.

ITU-T VCEG (Q6/16) and ISO/IEC MPEG (JTC 1/SC 29/WG 11) are studying the potential for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by the groups in this area. The JVET first met during 19-21 Oct. 2015. To alleviate various codec complexity issues, several optimization methods are designed for algorithm acceleration in the joint exploration model (JEM). The JEM is a video codec platform for the exploration of next-generation video coding technologies. Further aspects of the JEM are described in "Algorithm Description of Joint Exploration Test Model 2" Joint Video Exploration Team (JVET) of ITU-T SG 16 WP 3 and ISO/IEC JTC 1/SC 29/WG 11, 2nd Meeting: San Diego, USA, 20-26 Feb. 2016, Document No. JVET-B1001_v1. A version of the reference software, i.e., Joint Exploration Model 3 (JEM 3) can be downloaded from:

https://jvet.hhi.fraunhofer.de/svn/svn_HMJEMSoftware/tags/HM-16.6-JEM-3.0/. An algorithm description of Joint Exploration Test Model 3 (JEM3) may be referred to JVET-C1001.

Figure 1:
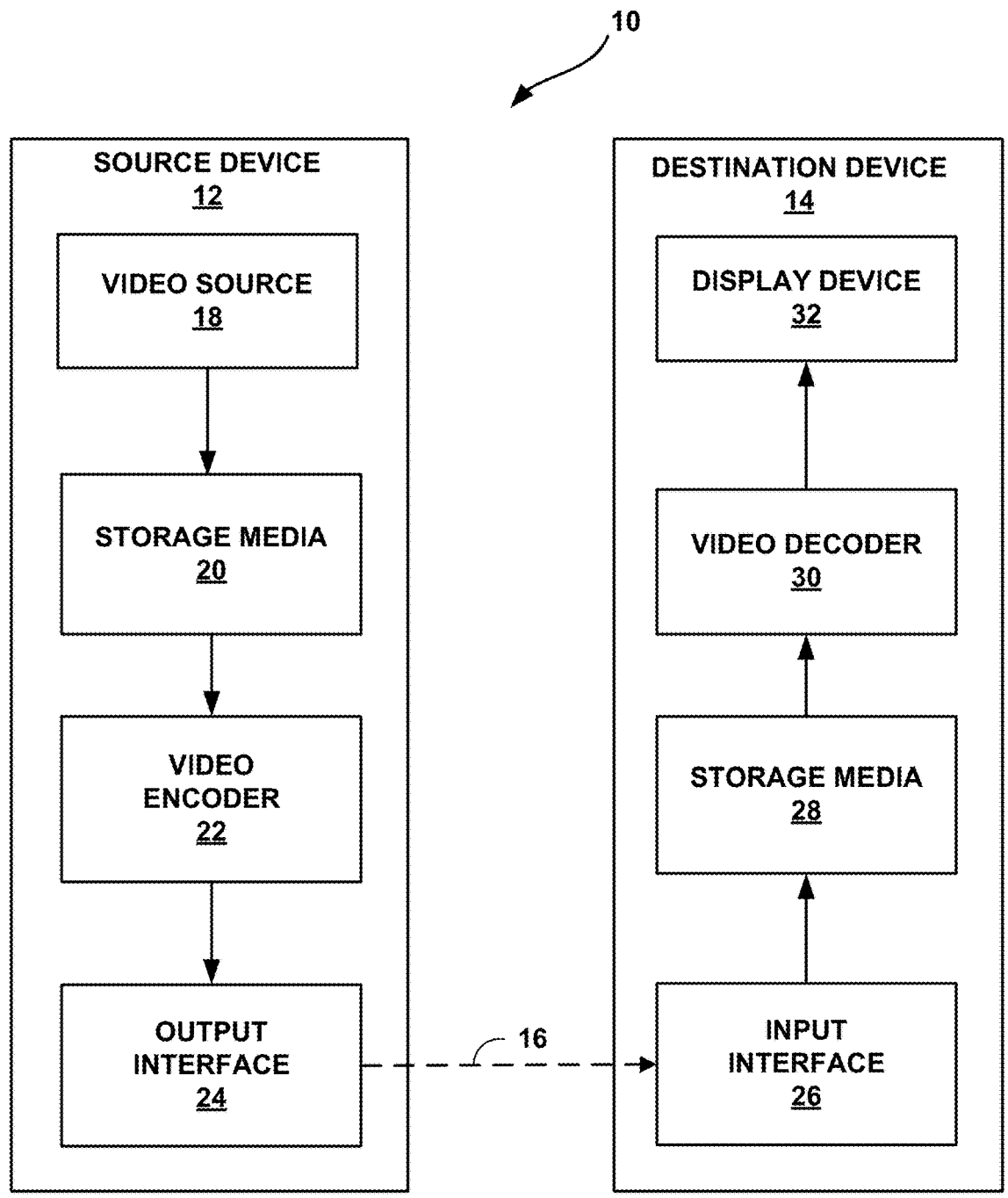
FIG. 1 is a block diagram illustrating an example video encoding and decoding system configured to implement techniques of the disclosure.

FIG. 1 is a block diagram illustrating an example video encoding and decoding system 10 that may be configured to perform techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, a storage medium 20 configured to store video data, a video encoder 22, and an output interface 24. Destination device 14 includes an input interface 26, a storage medium 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device 32.

The illustrated system 10 of FIG. 1 is merely one example. Techniques for processing and/or coding video data may be performed by any digital video encoding and/or decoding device. Although generally the techniques of this disclosure are performed by a video encoding device or video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 20) configured to store the video data. The techniques described in this disclosure may be applicable to video coding in general, and may be applied to wireless and/or wired applications. In each case, the captured, pre-captured, or computer-generated video may be encoded by video encoder 22. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques described in this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 22 of video encoder 22, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 22 and video decoder unit 30 each may be implemented as any of a variety of suitable encoder or decoder circuitry, such as one or more microprocessors, processing circuitry (e.g., fixed function circuitry, programmable processing circuitry, or any combination of fixed function circuitry and programmable processing circuitry), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 22 and video decoder 30 may be included in one or more encoders or decoders, either of which may be integrated as part of a combined encoder/decoder (CODEC) in a respective device.

In some examples, video encoder 22 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) of ITU-T Video Coding Experts Group (VCEG) and ISO/IEC Motion Picture Experts Group (MPEG). Next generation video coding standards are being developed at the time of this disclosure, subsequently to the finalization of ITU-H.265. Techniques of this disclosure may be used in conjunction with various video coding techniques that use or are eligible to use sign prediction, such as techniques described in the various standards listed herein, next-generation video coding standards that are currently under development, video coding techniques of JEM, etc.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 22 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

To generate a coded CTU, video encoder 22 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 22 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 22 may generate predictive blocks (e.g., luma, Cb, and Cr predictive blocks) for prediction blocks (e.g., luma, Cb, and Cr prediction blocks) of each PU of the CU.

Video encoder 22 may use intra prediction or inter prediction to generate the predictive blocks for a PU. If video encoder 22 uses intra prediction to generate the predictive blocks of a PU, video encoder 22 may generate the predictive blocks of the PU based on decoded samples of the picture that includes the PU.

After video encoder 22 generates predictive blocks (e.g., luma, Cb, and Cr predictive blocks) for one or more PUs of a CU, video encoder 22 may generate one or more residual blocks for the CU. As one example, video encoder 22 may generate a luma residual block for the CU. Each sample in the CU's luma residual block indicates a difference between a luma sample in one of the CU's predictive luma blocks and a corresponding sample in the CU's original luma coding block. In addition, video encoder 22 may generate a Cb residual block for the CU. In one example of chroma prediction, each sample in the Cb residual block of a CU may indicate a difference between a Cb sample in one of the CU's predictive Cb blocks and a corresponding sample in the CU's original Cb coding block. Video encoder 22 may also generate a Cr residual block for the CU. Each sample in the CU's Cr residual block may indicate a difference between a Cr sample in one of the CU's predictive Cr blocks and a corresponding sample in the CU's original Cr coding block. However, it should be understood that other techniques for chroma prediction may be used.

Furthermore, video encoder 22 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 22 may apply one or more transforms a transform block of a TU to generate a coefficient block for the TU. For instance, video encoder 22 may apply one or more transforms to a luma transform block of a TU to generate a luma coefficient block for the TU. A coefficient block may be a two-dimensional array of transform coefficients. A transform coefficient may be a scalar quantity. Video encoder 22 may apply one or more transforms to a Cb transform block of a TU to generate a Cb coefficient block for the TU. Video encoder 22 may apply one or more transforms to a Cr transform block of a TU to generate a Cr coefficient block for the TU.

After generating a coefficient block (e.g., a luma coefficient block, a Cb coefficient block or a Cr coefficient block), video encoder 22 may quantize the coefficient block. Quantization generally refers to a process in which transform coefficients are quantized to possibly reduce the amount of data used to represent the transform coefficients, providing further compression. After video encoder 22 quantizes a coefficient block, video encoder 22 may entropy encode syntax elements indicating the quantized transform coefficients. For example, video encoder 22 may perform Context-Adaptive Binary Arithmetic Coding (CABAC) on the syntax elements indicating the quantized transform coefficients.

Video encoder 22 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RB SP includes zero bits.

Video decoder 30 may receive a bitstream generated by video encoder 22. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 22. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Aspects of transform coefficient coding in HEVC and existing techniques of coefficient sign bit prediction are discussed below. According to HEVC transform coefficient coding, the transform coefficient block (TB) is first divided into coefficient groups (CG), where each CG represents a sub-block, such as a 4×4 sub-block. For example, a 32×32 TU has a total of 64 CGs, and a 16×16 TU has a total of 16 CGs. The entropy coding of the TB is performed in units of CGs. The CGs inside a TB are coded according to a given scan order. When coding each CG, the coefficients inside the current CG are scanned and coded according to a certain pre-defined scan order for 4×4 block. In JEM, the CG size could be either 4×4 or 2×2, depending on whether the height or width of one TB is equal to 2.

Figure 2:
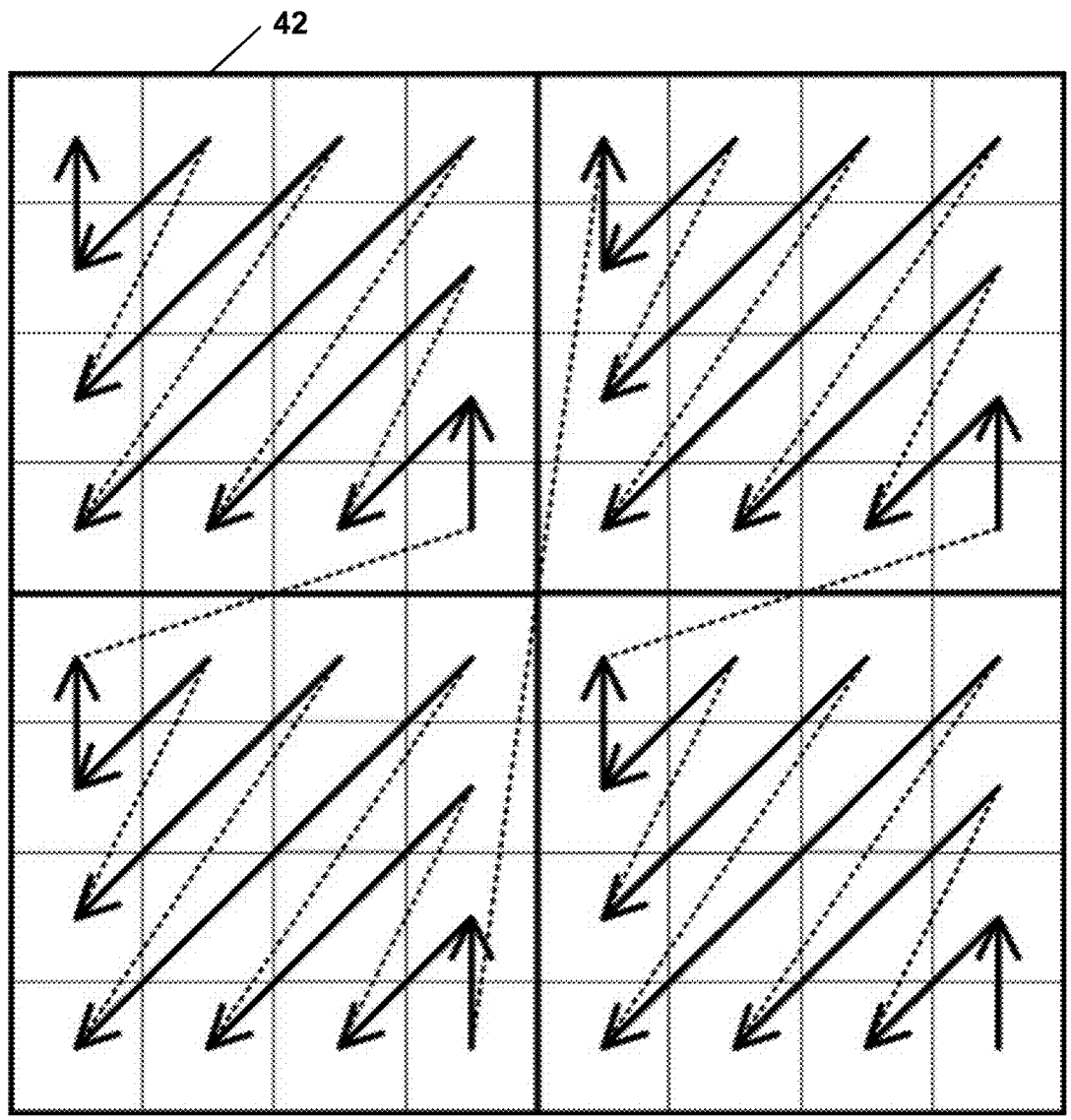
FIG. 2 is a conceptual diagram illustrating an example coefficient scan based on coefficient groups.

FIG. 2 is a conceptual diagram illustrating an example of a coefficient scan based on coefficient groups. More specifically, FIG. 2 illustrates the coefficient scan for an 8×8 TB 42 containing 4 CGs in HEVC. For each color component, video encoder 22 may first signal a one-bit flag to video decoder 30 to indicate whether a current TB (TB 42 in this case) has at least one non-zero coefficient. If there is at least one non-zero coefficient in the current TB (TB 42), video encoder 22 may then explicitly encode the position of the last significant coefficient in the coefficient scan order in the TB with a coordinate (or coordinates) relative to the top-left corner of the TB. The vertical or horizontal component of the coordinate(s) is represented by its prefix and suffix, where the prefix is binarized with truncated rice (TR), and the suffix is binarized with fixed length.

With such a position encoded and signaled, and also the coefficient scanning order of the CGs, video encoder 22 may further signal a one-bit flag for all CGs except the last CG (in scanning order), which indicates whether the respective CG contains any non-zero coefficients. For those CGs that contain non-zero coefficients, video encoder 22 may further encode and signal significant flags, absolute values of coefficients, and sign information of the non-zero coefficient(s) for each coefficient according to the pre-defined 4×4 coefficient scan order. In the HEVC transform coefficient entropy coding scheme, a sign bit, if coded, is always bypass coded. For instance, video encoder 22 and video decoder 30 may not apply a context, and may always encode/decode one (1) bit for each sign bit using an equal probability (EP) assumption.

Aspects of sign data hiding are discussed in this paragraph. For each CG, and depending on one or more criteria, video encoder 22, when using sign data hiding (SDH), may omit encoding the sign of the last nonzero coefficient (in reverse scan order) which is the first nonzero coefficient in the forward scan order. Instead, video encoder 22 may embed the sign value in the parity of the sum of the levels of the CG, using a predefined convention. The predefined convention is described as follows: even corresponds to "+" and odd to "−." An example criterion to use SDH is the distance in scan order between the first and the last nonzero coefficients of the CG. If the between the first and last nonzero coefficients in the CG is equal or larger than four (4), then video encoder 22 may use SDH. The value of four (4) was selected because it provides the largest gain on HEVC test sequences.

Aspects of coefficient sign prediction are described in the following paragraphs. To improve the coding efficiency for sign bit information, coefficient sign prediction methods have been proposed in various literature. For instance, "Residual Coefficient Sign Prediction" by Felix Henry and Gordon Clare, Joint Video Exploration Team (WET) of ITU-T SG 16 WP 3 and ISO/IEC JTC 1/SC 29/WG 11, Doc. WET-D0031, October 2016 (hereinafter, "Henry") proposed a sign prediction method on top of JEM.

To predict the sign for one coefficient, video decoder 30 may reconstruct TB 42 using both positive value and negative values for the respective sign. Each block reconstruction using a candidate sign value is referred to as a "hypothesis reconstruction." Video decoder 30 may evaluate the two hypothesis reconstructions using a given spatial-domain cost function, and the hypothesis which minimizes the cost function produces the predicted sign value. That is, video decoder 30 may generate a respective hypothesis reconstruction for the block, using a different sign or a different sign combination to generate each respective hypothesis reconstruction for the block.

Furthermore, to predict multiples signs for TB 42, e.g., 'N' number of signs, video decoder 30 may reconstruct TB 42 using different combinations of candidate sign prediction values, which includes a total of 2N different hypothesis reconstructions. Similarly, video decoder 30 may evaluate each hypothesis using a given spatial-domain cost function, and the hypothesis which minimize the cost function gives the predicted sign value combination.

The cost function typically measures spatial discontinuity between previously-reconstructed neighbor pixels and the currently-tested reconstructed block using one of the hypotheses. The hypothesis which shows the most smooth pixel value transition at the block boundary of the current block is considered to be the best prediction, with respect to the hypothesis prediction techniques described above. For example, in Henry, the cost is measured using the leftmost and topmost pixels of a hypothesis reconstruction.

Figure 3A:
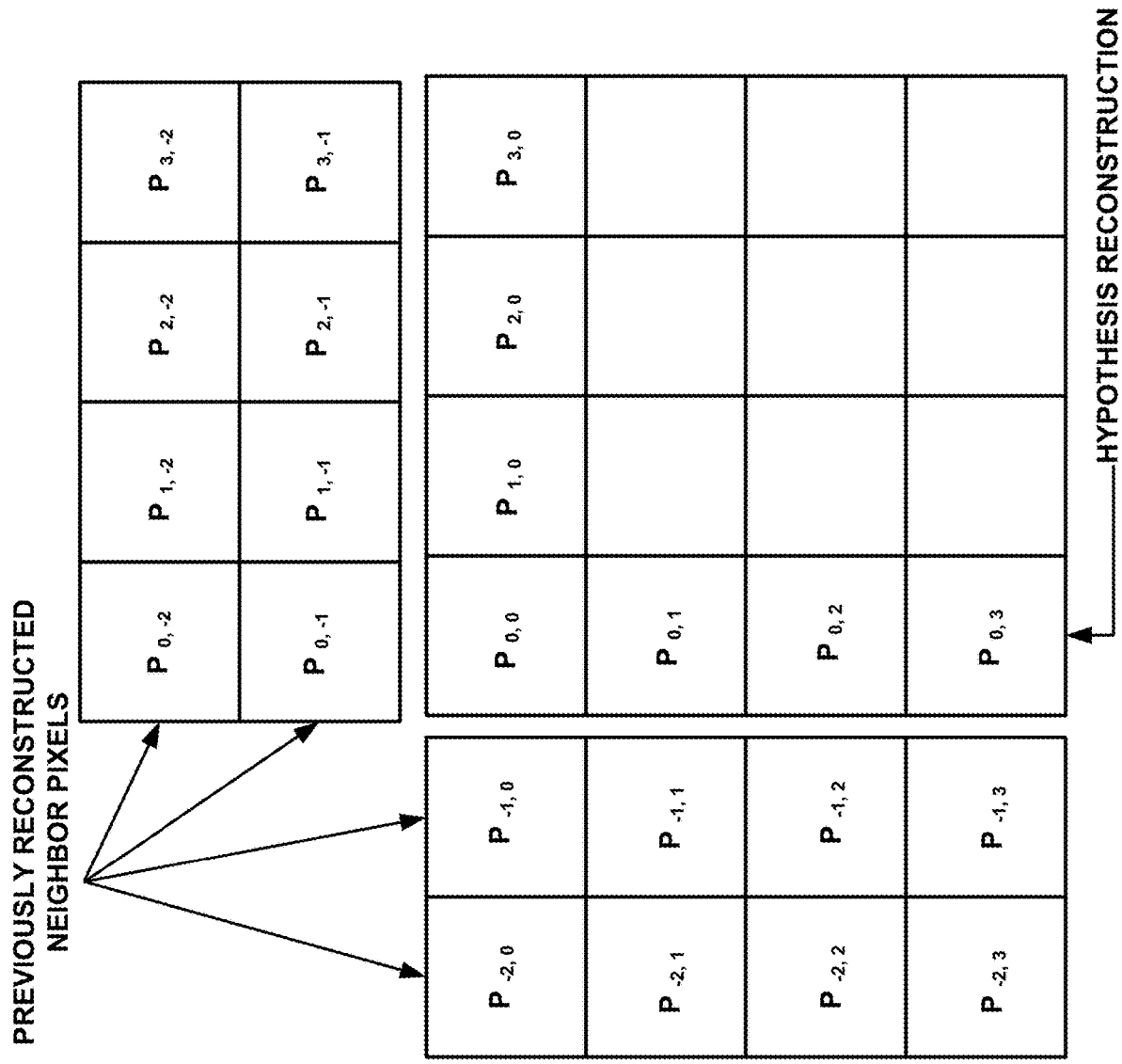

FIGS. 3A and 3B are diagrams illustrating hypothesis reconstruction and prediction techniques. FIG. 3A illustrates the hypothesis reconstruction and prediction techniques of Henry, which video decoder 30 use in conjunction with the techniques of this disclosure. FIG. 3A illustrates the coordinates of various pixels of TB 42, and indicates the previously-reconstructed neighbor pixels as well as for the hypothesis reconstruction. FIG. 3B sets forth mathematical formulae illustrating hypothesis reconstruction and prediction techniques that video decoder 30 may implement in conjunction with the techniques of this disclosure.

According to a specific sign prediction scheme described in Henry, video decoder 30 may initially dequantize the TU, and then choose 'n' coefficients for which sign prediction is to be performed. Video decoder 30 may scan the coefficients in raster-scan order. Dequantized values over a predefined threshold are preferred over values lower than the predefined threshold when collecting the 'n' coefficients to treat. With these 'n' values, video decoder 30 may perform simplified border reconstructions on '2n' occasions as described below, with one reconstruction per unique combination of signs for the 'n' coefficients.

To reduce the complexity of performing sign prediction, video decoder 30 may perform a template-based hypothesis reconstruction. For a particular hypothesis reconstruction, video decoder 30 may recreate only the leftmost and topmost pixels of the block, from the inverse transformation added to the block prediction. Although (according to the use-case scenario illustrated in FIG. 3A) the first (vertical) inverse transform is complete, the second (horizontal) inverse transform only has to create the leftmost and topmost pixel outputs, and is thus faster. An additional flag, "topLeft", has been added to inverse transform functions to allow this.

In addition, the number of inverse transform operations performed is reduced by using a system of 'templates'. In this way, when predicting 'n' signs in a block, video decoder 30 may only perform 'n+1' number of inverse transform operations. Examples of the steps performed are listed below:

1. Video decoder 30 may perform a single inverse transform operating on the dequantized coefficients, where the values of all signs being predicted are set to be positive. Once added to the prediction of the current block, this corresponds to the border reconstruction for the first hypothesis.

2. For each of the 'n' coefficients for which video decoder 30 predicts signs, an inverse transform operation is performed on an otherwise empty block containing the corresponding dequantized (and positive) coefficient as its only non-null element. The leftmost and topmost border values are saved in what is termed a 'template' for use during later reconstructions.

Video decoder 30 may start border reconstruction for a later hypothesis by taking an appropriate saved reconstruction of a previous hypothesis which only uses a single predicted sign to be changed from positive to negative in order to construct the desired current hypothesis. Video decoder 30 may then approximate this change of sign by the doubling and subtraction from the hypothesis border of the template corresponding to the sign being predicted. The border reconstruction, after applying cost function measurement, is then saved, if the border reconstruction is available to video decoder 30 to be reused for constructing one or more later hypotheses.

Table 1 below maps a template name to a corresponding template

TABLE 1

| Template Name | How to Create |
|---|---|
| T001 | inv xform single +ve $1^{st}$ sign-hidden coeff |
| T010 | inv xform single +ve $2^{nd}$ sign-hidden coeff |
| T100 | inv xform single +ve $3^{rd}$ sign-hidden coeff |

Table 2 below shows save/restore and template application for a 3 sign, 8 entry use case

TABLE 2

| Hypothesis | How to Create | Store for later reuse as |
|---|---|---|
| H000 | inv xform all coeffs add to pred | H000 |
| H001 | H000 − 2*T001 | |
| H010 | H000 − 2*T010 | H010 |
| H011 | H010 − 2*T001 | |
| H100 | H000 − 2*T100 | H100 |
| H101 | H100 − 2*T001 | |
| H110 | H100 − 2*T010 | H110 |
| H111 | H110 − 2*T001 | |

In some examples, video decoder 30 may use these approximations only during the process of sign prediction, and not during final reconstruction. For a transform coefficient with larger magnitude, the sign prediction generally yields a better chance to achieve a correct prediction. This is because an incorrect sign prediction for a transform coefficient with larger magnitude typically shows more discrepancy with respect to boundary sample smoothness.

With sign prediction, instead of coding the explicit sign value, video encoder 22 and video decoder 30 may encode/decode the correctness of the sign prediction. For example, for predicting a coefficient sign which actually has a positive value, if the predicted sign is also positive (e.g. if the sign prediction is correct), video encoder 22 may encode, and video decoder 30 may decode, a '0' bin. Otherwise, if the predicted sign is negative, (e.g., if the sign prediction is not correct), video encoder 22 may encode, and video decoder 30 may decode, a '1' bin. In this way, sign prediction may utilize the level value (e.g., magnitude) of the transform coefficient as the context for coding the correctness of sign prediction, because a larger magnitude of transform coefficient tends (or 'leans') towards a higher chance of a '0' bin.

Existing sign prediction techniques may cause one or more potential issues. As one example, the existing sign prediction technology shows relatively high complexity for both encoders and decoders, because the existing sign prediction techniques may use multiple inverse transform processes to generate the leftmost and topmost pixel samples during a coding run, or "on the fly." For instance, four (4) signs would result in a total of sixteen (16) possibilities, with multiple reconstructions for each hypothesis. As a result, video decoder 30 would perform inverse transform, inverse quantization, and reconstruction sixteen (16) times in each case. The increased complexity may be undesirable for a practical video codec. Moreover, for larger numbers, the number of predicted signs may increase at a fast rate. That is, the complexity increase of existing sign prediction technology may increase quickly if a relatively larger number of signs are predicted. In some examples, there may be 6, 7, 8, or a greater number of predicted signs for a given block.

Various techniques of this disclosure are generally directed to mitigating or potentially eliminating one or more of the issues discussed above, with respect to sign prediction. Aspects of the various techniques of this disclosure are described as being performed by video encoder 22 and video decoder 30 below. It will be appreciated, however, that the techniques described herein may be performed by various video coding devices, including video encoders that are configured to decode encoded video data (e.g., via a "decoding loop").

Figure 4:
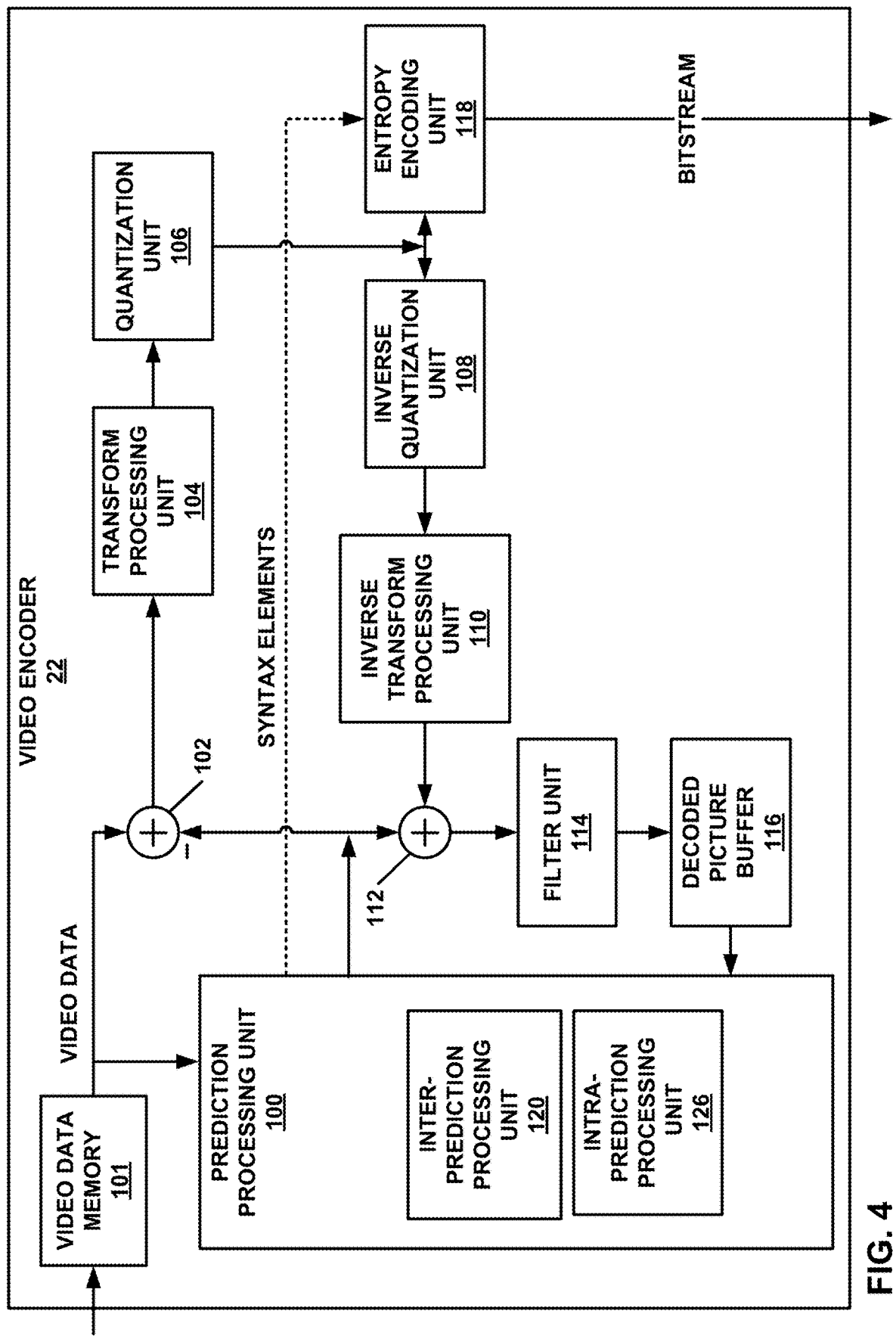
FIG. 4 is a block diagram illustrating an example of a video encoder configured to implement techniques of the disclosure.

FIG. 4 is a block diagram illustrating an example video encoder 22 that may implement the techniques of this disclosure. FIG. 4 is provided for purposes of explanation and should not be considered limiting of the techniques as broadly exemplified and described in this disclosure. The techniques of this disclosure may be applicable to various coding standards or methods.

In the example of FIG. 4, video encoder 22 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 22. The video data stored in video data memory 101 may be obtained, for example, from video source 18. Decoded picture buffer 116 may be a reference picture memory that stores reference video data for use in encoding video data by video encoder 22, e.g., in intra- or inter-coding modes. Video data memory 101 and decoded picture buffer 116 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 22, or off-chip relative to those components. Video data memory 101 may be the same as or part of storage media 20 of FIG. 1.

Video encoder 22 receives video data. Video encoder 22 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns.

Video encoder 22 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 22 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 22 and video decoder 30 may support PU sizes of 2N×2N or N×N for intra prediction, and symmetric PU sizes of 2N×2N, 2N×N, N×2N, N×N, or similar for inter prediction. Video encoder 22 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 22 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 22 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 22. In various examples, entropy encoding unit 118 may be configured to implement one or more techniques of this disclosure. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 22 may output a bitstream that includes entropy-encoded data generated by entropy encoding unit 118. For instance, the bitstream may include data that represents a RQT for a CU.

According to some aspects of this disclosure, video encoder 22 may use a pre-stored set of reconstructed residual samples to perform hypothesis reconstruction. Techniques of this disclosure by which video encoder 22 uses pre-stored reconstructed residual samples are generally referred to herein as "template-based reconstruction" techniques. For instance, the pre-stored reconstructed residual samples may be stored to any memory accessible (e.g., via direct or indirect communicative coupling) to processing circuitry of video encoder 22, such as storage media 20 of source device 12 and/or video data memory 101. In some instances of template-based reconstruction according to aspects of this disclosure, video encoder 22 may store one or more fully-reconstructed and/or partially-reconstructed residual blocks, and then use some combination (e.g., a linear combination) of the stored information to form a template. In turn, video encoder 22 may use the template to derive all of the possible reconstructed values. Each stored set of residual blocks may be pre-calculated using a pre-defined transform coefficient block. To perform hypothesis reconstruction, video encoder 22 may identify a selected group of fully- and/or partially-reconstructed residual blocks the stored set, and generate/estimate the hypothesis reconstruction using some combination the reconstructed residual blocks identified in this fashion.

As discussed above, video encoder 22 (and/or components thereof) may be configured, according to aspects of this disclosure, to mitigate various issues associated with existing sign prediction technology. According to some examples of the template-based reconstruction techniques of this disclosure, video encoder 22 may form each reconstructed block of the stored set using a pre-defined quantized transform coefficient block (TB), a given dequantization parameter, and a given primary transform and/or a given secondary transform. An example is discussed below with respect to a particular coefficient, for which the position is denoted as f(x,y) in an M×N TB, where 0<=x<M, 0<=y<N. Given the inverse transform method (including primary transform and/or secondary transform) and dequantization parameter, video encoder 22 may generate a quantized coefficient block (denoted as B) by setting f(x,y) to a certain value, and by setting all other coefficients to a different value from the value assigned to f(x,y). For example, video encoder 22 may set the value of f(x,y) to one (1), and may set all other coefficients to zero (0).

In turn, video encoder 22 may pre-calculate a fully- or partially-reconstructed residual block (denoted as R) by applying the given dequantization and inverse transform on the quantized coefficient block B. Video encoder 22 may pre-store the reconstructed residual block R to a memory (e.g., to storage media 20 of source device 12 and/or to video data memory 101). By pre-storing the partially- or fully-reconstructed block R, video encoder 22 may leverage existing resources (e.g., in the form of storage media 20 and/or video data memory 101) to cache pre-calculated information that can be used to improve the efficiency of calculations to be performed at a later stage. In this manner, during sign prediction operations, if the sign of coefficient f(x,y) needs to be predicted in an M×N TB with the same inverse transform and dequantization parameter, the techniques of this disclosure enable video encoder 22 to avoid performing an inverse transform for f(x,y). Instead, video encoder 22 may scale the pre-stored reconstructed residual block R by a factor of |f(x,y)| and then use the scaled version of the pre-stored reconstructed residual block R to estimate the reconstructed block.

In another example of the template-based reconstruction techniques of this disclosure, video encoder 22 may pre-store a dequantized version of the TB. That is, in these examples, video encoder 22 may reconstruct the current block using dequantized versions of the (fully or partially) reconstructed blocks stored to storage media 20. In other words, according to these examples, video encoder 22 may reconstruct the current block using a pre-defined dequantized TB, and one or both of a given primary transform or a given secondary transform.

One use-case scenario of the dequantized TB-based implementations of the template-based reconstruction techniques of this disclosure is described below with respect to a particular coefficient f(x,y) in an M×N TB, where 0<=x<M, 0<=y<N, given the inverse transform method (including primary transform and/or secondary transform). In this example, video encoder 22 may generate a dequantized coefficient block B by setting f(x,y) to a certain value, and by setting all other coefficients to another value. For instance, video encoder 22 may set f(x,y) to a value of one (1), and may set all of the remaining coefficients to a value of zero (0). In turn, video encoder 22 may pre-calculate a fully or partially reconstructed residual block R by applying the given inverse transform on B, and may pre-store the reconstructed residual block R to a memory (e.g., to storage media 20 and/or video data memory 101).

In this way, during sign prediction, if the sign of the quantized coefficient f(x,y) is to be predicted in an M×N TB with the same inverse transform, the techniques of this disclosure enable video encoder 22 and/or video decoder 30 to avoid doing inverse transform for f(x,y). Instead, video encoder 22 may first dequantize the quantized coefficient f(x,y) to be f(x,y)' (to denote the dequantized coefficient), then video encoder 22 ma scale the pre-stored reconstructed residual block R by a factor of |f(x,y)'|. Video encoder 22 may then use the scaled version (i.e., scaled using the dequantized value) of the pre-stored dequantized reconstructed residual block R to estimate the reconstructed block. As illustrated in the discussion above, video encoder 22 may implement the template-based reconstruction techniques of this disclosure by optionally using dequantized TB information for the pre-stored template, with varying computation complexity arising from the optional use or non-use of the dequantization operations.

In some implementations of the template-based reconstruction techniques of this disclosure, video encoder 22 may pre-store the set of partially- and/or fully-reconstructed residual blocks with fractional precision. In some examples, video encoder 22 may first scale the set of reconstructed residual blocks with a pre-defined factor (e.g., 2, 4, 8, 16, etc.), and then round the result to the nearest integer, and store the rounded, scaled result to storage media 20 and/or video data memory 101. In this way, video encoder 22 may enhance the precision of the pre-stored reconstructed residual blocks. Moreover, in both the fractional precision implementations and the scaling/rounding based implementations described above, video encoder 22 may avail of the benefits of the template-based reconstruction techniques of this disclosure, while reducing the memory requirements with respect to storage media 20 and/or video data memory 101.

According to some implementations of the template-based reconstruction techniques of this disclosure, video encoder 22 may pre-store the set of fully- and/or partially-reconstructed residual blocks with clipped values. In some instances, video encoder 22 may clip the values of the reconstructed residual blocks before storage, such that the clipped values fit a restricted bit range of representation. For example, by clipping the values using constraints of a minimum value (Vmin) of negative eight (−8) and a maximum value (Vmax) of seven (7), video encoder 22 may form the entries of the pre-stored reconstructed residual values such that all of the pre-stored reconstructed residual values can be represented using, at most, four (4) bits. In various use-case scenarios, video encoder 22 may utilize one or more of the factional precision implementation, the scaling/rounding implementation, or the clipping-based implementations of the template-based reconstruction techniques individually or in any combination, in accordance with various aspects of this disclosure.

In some examples of the template-based reconstruction techniques of this disclosure, video encoder 22 may use a linear combination of certain identified reconstructed residual blocks of the stored reconstructed residual blocks to reconstruct the current TB. For example, the linear combination may represent a weighted sum of the identified stored reconstructed residual blocks. To calculate the weighted sum, video encoder 22 may determine the respective weights using the magnitude (also referred to as 'level value') of a quantized or dequantized (as the case may be) transform coefficient for which the sign is being predicted. By using a weighted sum of multiple stored reconstructed residual blocks, video encoder 22 may improve hypothesis precision by utilizing data from multiple previously-reconstructed blocks.

Video encoder 22 may, in some examples, implement template-based reconstruction techniques of this disclosure in a manner that makes us of offline computation. Because different transform and/or quantization methods may be available to video encoder 22, video encoder 22 may need to store multiples of reconstructed blocks for a single quantized coefficient block. To mitigate storage requirements and to ease the resource consumption of accessing the pre-calculated residual blocks, video encoder 22 may avail of offline computation capabilities. For instance, video encoder 22 may perform a merging process on the pre-stored residual blocks, such that multiple residual blocks are merged and represented by one residual block. In some examples, video encoder 22 may pre-define a function $f$ to derive one pre-stored residual block from another pre-stored residual block, such that only one of several residual blocks may need to be stored. That is, in these examples, video encoder 22 may store one residual block, and may derive other residual blocks using the pre-defined function $f$ and the single stored residual block.

In some implementations of the template-based reconstruction techniques of this disclosure, video encoder 22 may store pre-calculated residual blocks to off-chip memory (also referred to as "external" memory) of source device 12. The total size of the set of pre-calculated residual blocks may, in some instances, be large, and therefore may be difficult to store in on-chip memory. To continue using the template-based reconstruction techniques of this disclosure while operating within the available storage constraints, video encoder 22 may pre-store the set of pre-calculated residual blocks to off-chip memory, which, in some examples, tends to represent a cheaper memory than on-chip memory. In these implementations, video encoder 22 may only load the residual blocks, as needed, to on-chip memory. For instance, video encoder 22 may load the residual blocks once per bigger block or bigger picture area, such as for a largest coding unit (LCU).

According to some implementations of the template-based reconstruction techniques of this disclosure, video encoder 22 may use each of the pre-stored set of partial residual blocks as a template for sign prediction. In some examples, video encoder 22 may store only the leftmost and topmost residual pixels for the pre-calculated residual blocks. In one example, video encoder 22 may store the top-left residual pixel, in addition to one or more residual pixels of the top row (starting from the residual pixel positioned immediately right of the top-left residual pixel) and/or one or more residual pixels of the leftmost column (starting from the residual pixel positioned immediately below of the top-left residual pixel). In some examples, video encoder 22 may apply the template-based sign prediction process described in Henry in conjunction with the pre-stored set of partial residual blocks (of this disclosure) in such a way that the template is not generated by doing partial inverse transform on the fly. Instead, video encoder 22 may generate the template by accessing the pre-stored set of partial residual blocks, and performing a scaling operation.

Video encoder 22 may, in some examples, be configured according to aspects of this disclosure to perform selective sign prediction. For instance, video encoder 22 may perform selective sign prediction with respect to lower-frequency transform coefficients. Video encoder 22 may also perform selective sign prediction to avoid sign prediction for outlier block sizes (e.g. very large or very small block sizes). Examples of outlier dimensions that video encoder 22 may use in accordance with the techniques of this disclosure are discussed below. To perform the selective sign prediction techniques of this disclosure, video encoder 22 may determine various conditions under which sign prediction is to be performed or alternatively skipped. Various conditions for the selective sign selection aspects of this disclosure are described in the following paragraphs.

Video encoder 22 may apply several of the conditions for the selective sign prediction aspects of this disclosure on a block-wide basis. These conditions may relate to various features including, but not limited to, the block width, block height, block area (also referred to as "size"), transform coefficient frequency locations, last position, intra prediction mode, whether only a primary transform is used to code a block, whether only particular transform functions or certain transform subset are used for coding the block, inverse transform method, whether the block is intra coded or inter coded blocks, or any other decoded information of the current and/or neighbor block(s).

According to some implementations of the selective sign prediction techniques of this disclosure, video encoder 22 may not apply sign prediction if either the width of the currently-encoded block or the height of the currently-encoded block is larger than a pre-defined threshold. In contrast, according to existing sign prediction technology, sign prediction would be applied regardless of the block width or height, as the case may be. In some examples, the threshold may be configurable, and video encoder 22 may signal the threshold. In various examples, video encoder 22 may set the threshold to values including, but not limited to 4, 8, 16, 32, or 64.

In some examples of the selective sign prediction techniques of this disclosure, video encoder 22 may configure the threshold value to be dependent on coding modes used to encode the block. For example, video encoder 22 may configure the threshold to be different for intra-coded blocks and inter-coded blocks. In one example, video encoder 22 may set the threshold value to 32 for intra-coded blocks, while setting the threshold value to 64 for inter-coded block. In some examples, video encoder 22 may not apply sign prediction if the minimum or maximum of block width or block height exceeds a threshold.

According to some examples of the sign prediction techniques of this disclosure, video encoder 22 may not apply sign prediction for transform coefficients that are not located in the top-left K×L part of a TB. K×L may represent a square sub-block of the TB, such as a sub-block having a dimensionality of 2×2, 3×3, 4×4 or 8×8, etc. In contrast, according to existing sign prediction technology, sign prediction would be applied for transform coefficients positioned outside of the top-left K×L portion of the TB. In some examples, the values of K and/or L may further depend on coding modes and/or quantization parameters. In the specific example of the K×L portion of the TB representing a 2×2 sub-block, there may be only four (4) possible predicted signs.

In some implementations of the selective sign prediction techniques of this disclosure, video encoder 22 may limit the inverse transform performed in the sign prediction process to certain inverse transform(s). For example, video encoder 22 may impose the inverse transform constraint while generating a hypothesis during the hypothesis prediction process. The selected transform(s) can be different from the inverse transform which video encoder 22 applies to generate the actual reconstructed block after deriving the actual coefficient signs.

In one such example, video encoder 22 may only use discrete cosine transform type-II (DCT-II) as the primary inverse transform during sign prediction. In another such example, during sign prediction, video encoder 22 may replace the secondary transform with a transform using a pre-defined permutation matrix. The pre-defined permutation matrix may include entities of "+1" and "−1". In another example, video encoder 22 may not use a secondary transform during sign prediction.

According to some examples of the selective sign prediction techniques of this disclosure, video encoder 22 may apply sign prediction only for those blocks that are encoded using only a primary transform. By limiting sign prediction in this manner, video encoder 22 may reduce coding complexity, such that the complexity of the inverse transform may be smaller than the complexity arising from having a primary and a secondary transform applied together. In another example, video encoder 22 may apply sign prediction only for those blocks that are encoded using a certain transform core or certain transform set/subset. Limiting sign prediction in this manner may yield potential benefits because it is possible that sign prediction may not work efficiently for all transform basis/cores, and coding complexity can thereby be reduced by limiting the application of sign prediction in this way.

Some aspects of this disclosure are directed to techniques for cost function measurement. According to the cost function measurement aspects of this disclosure, video encoder 22 may utilize previously-decoded information (obtained via the reconstruction loop) to measure the cost function for each hypothesis reconstruction. The previously-decoded information that video encoder 22 may leverage for cost function measurement includes, but is not limited to, the width of the current block, the height of the current block, the current block's area (also referred to as "size" herein), transform coefficient frequency locations, a last position, an intra prediction mode used for encoding the block, whether the evaluated block(s) are intra-coded or inter-coded, or any encoded information of the current and/or neighbor block(s).

In some examples, video encoder 22 (or one or more components thereof) may implement the cost function measurement aspects of this disclosure by measuring a difference between reconstructed samples of the neighboring block(s) and the reconstructed samples of the current block located along the boundary. The measured difference is also referred to herein as a "gradient" to illustrate that a difference can be expressed as the slope at a given point of a curve. That is, instead of measuring the first order information representing the sample values, video encoder 22 may implement the cost function measurement techniques of this disclosure to measure second order (difference or gradient) information that is comparative between the neighboring reconstructed samples and the reconstructed samples of the current block positioned along the boundary.

According to this implementation, video encoder 22 may generate estimated boundary residual samples by subtracting the neighboring reconstructed samples from the prediction samples located at the current block boundary (or vice versa). That is, video encoder 22 may use the subtraction operation(s) to obtain the second order information represented by the difference between the estimated boundary residual samples and the candidate boundary residual samples. For each candidate combination of signs, the generated residual samples represent a set of "candidate residual samples." By using the second order gradient information between the neighboring residual samples and the boundary-interfacing residual samples of the current block, video encoder 22 may avoid instances of duplicate reconstruction processes, in which the same prediction samples are used to produce candidate residual samples multiple times. In this way, techniques of this disclosure enable video encoder 22 to reduce computing resource consumption and conserve bandwidth that would otherwise be expended for redundant candidate residual sample generation and signaling of the redundant candidate residual sample information.

In some examples of the cost function measurement techniques of this disclosure, video encoder 22 may be configured to measure the pixel value difference (also referred to herein as a "pixel gradient value") along an intra-prediction direction to measure the cost function. In one such example, video encoder 22 may pre-select a partial subset of allowed intra prediction directions, and may map each allowed intra prediction direction to one of the pre-selected intra directions which can be used to approximate the intra prediction direction. In this example, video encoder 22 may measure the pixel value difference along the mapped direction in the cost function calculation.

In cases where the intra prediction direction is not available to video encoder 22 (e.g., if one of the evaluated blocks is inter-coded), video encoder 22 may instead derive an intra prediction mode. Video encoder 22 may derive the intra prediction mode from the spatial neighboring coded blocks, or a block identified by a motion vector in a coded picture. If the intra prediction direction points to a fractional position, video encoder 22 may apply an interpolation process to derive the value of the fractional position. Video encoder 22 may apply the interpolation filter used for generating the intra-predicted block, or may use a different (e.g., simpler) interpolation filter instead.

According to some of the cost function measurement aspects of this disclosure, video encoder 22 may measure the cost function using a second or higher order (N-th order, where 'N' represents an integer value of two or greater) order of the pixel value difference. For instance, video encoder 22 may use multiple reference lines (e.g., two or more) to measure the cost value. The number of reference lines that video encoder 22 uses for measuring the cost value may depend on coded information, including, but not limited to, the intra prediction mode and/or neighboring reconstructed values. Video encoder 22 may, in some instances, set the maximum number of reference lines to be equal to the required number of reference lines for intra prediction.

According to some implementations of the cost function measurement aspects of this disclosure, video encoder 22 may exclude some pixels from the cost function measurement operations, depending on whether one or more given criteria are satisfied. In one example, video encoder 22 uses a criterion of whether the absolute value of a first order, second order (gradient), or N-th order derivative is less than a given threshold value. In another example, video encoder 22 uses a criterion of whether the neighboring reconstructed samples used to calculate the N-th order derivative is available. In another example still, video encoder 22 uses a criterion of whether identity transform or transform skip is applied to the horizontal or vertical transform.

According to some implementations of the cost function measurement aspects of this disclosure, video encoder 22 may, when measuring the cost using neighboring reconstructed values, calculate the cost values for multiple directions. That is, video encoder 22 may calculate the cost values for multiple directions instead of calculating the first order, second order (gradient), or N-th order differences along a fixed or pre-defined direction (e.g., horizontal direction for a left block boundary and vertical direction for a top block boundary). Rather, according to these implementations, video encoder 22 calculates the cost values for multiple directions, and uses the minimum cost for measuring the cost.

In some examples of the cost function measurement techniques of this disclosure, for relatively larger block sizes, video encoder 22 may calculate the cost function using a downsampled hypothesis reconstruction. By using a downsampled hypothesis reconstruction for cost function measurement, video encoder 22 may reduce the complexity of cost function application with respect to larger block sizes. According to some of the cost function measurement techniques of this disclosure, video encoder 22 may measure the pixel value difference only for partial pixels in the reconstructed block and neighbor block(s). Partial pixels may be, for example, corner pixels. Errors typically tend to be larger for corner pixels. In another example, video encoder 22 may exclude the corner pixels from the difference measure based on the corner pixels being potential outliers, or may assign different weights to the selected pixels.

According to some implementations of the cost function measurement aspects of this disclosure, video encoder 22 may determine the number of predicted signs (e.g., 0, 1, 2, 3, 4, 5, 6, etc.) in a way that the number of predicted signs depends on previously-encoded information. Non-limiting examples of previously-encoded information that video encoder 22 may use in determining the number of predicted signs include, but are not limited to, intra prediction mode, block width/height, block size (area), QP, color components, temporal layer, whether the block is intra-coded or inter coded, whether transform skip or identity transform is applied, whether non-separable secondary transform is applied, quantized coefficients, the presence/value of an enhanced multiple transform (EMT) index, or the presence/value of a position-dependent prediction combination (PDPC) flag or index.

According to some implementations of the cost function measurement aspects of this disclosure, video encoder 22 may, when multiple 'M' signs are to be predicted, perform sign prediction in a unit or group manner. That is, video encoder 22 may perform sign prediction for a group, instead of testing all the possible 2^M hypothesis reconstructions, where the 'M' signs are divided into 'N' groups. Video encoder 22 may predict each group of signs by setting the remaining groups of signs as previously-predicted values or default value, if the remaining group of signs have not yet been predicted. Video encoder 22 may iterate the group-based sign prediction process for multiple rounds until a pre-defined limitation is met. Video encoder 22 may predict a group of signs with larger transform coefficient levels prior to predicting a group of signs with relatively lower coefficient levels. Video encoder 22 may terminate the iterations when the predicted signs for each group no longer change, or the iteration number has met a pre-defined threshold value, or the cost difference between iterations (for example, succeeding iterations) has stopped exceeding a certain threshold.

The following paragraphs describe aspects of this disclosure that generally relate to the selection of coefficient signs to be predicted. According to the coefficient sign selection aspects of this disclosure, video encoder 22 may select and/or determine predicted transform coefficients by utilizing already-available decoded information (e.g., via a decoding loop implemented by video encoder 22). The previously-decoded information that video encoder 22 may use for coefficient sign selection includes, but is not limited to, one or more of the width of the current block, the height of the current block, the area (also referred to as "size") of the current block, transform coefficient frequency locations within the current block, last position, an intra prediction mode used to encode the current and/or neighboring block(s), whether sign data hiding is applied with respect to the current and/or neighboring block(s), whether the current and/or neighboring block(s) are intra-coded or inter-coded, or any encoded information of the current and/or neighbor block(s). In various examples, video encoder 22 (or one or more components thereof) may implement the coefficient sign selection aspects of this disclosure such that the maximum number of predicted signs depends on whether the current block is inter-coded or intra-coded. In some examples, video encoder 22 may set the maximum number of predicted signs based on inverse transform method (e.g., which primary and/or secondary transform) is applied for dequantizing the block.

In some examples, video encoder 22 may apply sign hiding even when sign prediction is applied the block (TB). In these examples, video encoder 22 may hide the sign of the last nonzero coefficient in the forward scanning order, instead of hiding the first nonzero coefficient in the forward scanning order. Furthermore, in some such examples, video encoder 22 may not perform sign data hiding at the CG-level. That is, in these instances, consecutive nonzero coefficients, even if located in different CGs, may be jointly considered for sign data hiding.

In some examples, video encoder 22 may pre-define several threshold values (denoted by $t_0, t_1, \ldots, t_N$) where $t_0 > t_1 > \ldots > t_N$. In these examples, video encoder 22 may derive several intervals as $(t_0, +\infty)$, $[t_1, t_0)$, $[t_N, t_{N-1})$ in descending order. Moreover, video encoder 22 may compare dequantized coefficient levels to each one of the given intervals until video encoder 22 identifies or detects one interval which covers the dequantization coefficient level. Video encoder 22 may identify the signs of coefficients as predicted signs, according to the descending order of the threshold values.

For instance, video encoder 22 may first place the signs for coefficients in the interval $(t_0, +\infty)$ into the list of predicted signs, and then place the signs for coefficients in the interval $[t_1, t_0)$ into the list of predicted signs. Video encoder 22 may iterate this process continues for each interval in descending order until the number of predicted signs reaches the pre-defined maximum number of predicted signs, or video encoder 22 has checked all available intervals. If video encoder 22 determines that a coefficient has a level less than $t_N$, video encoder 22 may not consider the sign to be a predicted sign. $(600, +\infty)$, $[300, 600)$ represents a common or even typical setting. Video encoder 22 may not consider the signs of dequantized coefficient levels being less than 300 as predicted signs, in this example.

Some aspects of this disclosure are directed to determining the CABAC context for coding coefficient signs. That is, according to these techniques, video encoder 22 may define context values for the signs, by setting different contexts for different intervals of coefficient levels. Again, intervals can vary based on various features. The context value that video encoder 22 uses encoding coefficient signs may depend on the dequantized level (e.g., the absolute value) of the corresponding coefficient. Video encoder 22 may pre-define several intervals, and may determine one of the context values using the index of interval to which the dequantized level value belongs.

An example setting of intervals are (0, 600), [600, +∞), or (0, 600], (600, +∞). With this interval setting, if the coefficient level falls in the range of (0, 600), then video encoder 22 may set the context value to zero (0). Otherwise (i.e., if the coefficient level falls outside of the (0, 600) range), video encoder 22 may set the context value to one (1). In various examples, video encoder 22 (or one or more components thereof) may implement the CABAC context determination aspects of this disclosure to determine the intervals as being dependent on previously-encoded information, including, but not limited to, one or more of the QP for the block, the block area ("size"), block width, or block height.

Various aspects of this disclosure are directed to a searching order for a hypothesis, such as for one of the two hypotheses that video encoder 22 may form during a hypothesis reconstruction for a block. Again, each hypothesis consists of one possible combination of candidate sign values. For example, if video encoder 22 predicts two signs, video encoder 22 may need to form a total of four hypotheses. That is, in the two-sign scenario, video encoder 22 may form four possible combinations of candidate sign values, including the following:

Hypothesis index 0: {0, 0}
Hypothesis index 1: {0, 1}
Hypothesis index 2: {1, 0}
Hypothesis index 3: {1, 1}, where the first digit indicates the first predicted sign, and the second digit indicates the second predicted sign. In the examples above, zero (0) indicates a positive sign, while one (1) indicates a negative sign. The combination of candidate sign values in each hypothesis corresponds to the binarized representation of the hypothesis index. For example, a {1, 1} combination yields the hypothesis index of three, because the 2^0 bit and the 2^1 bit are both set to '1' values. If a coding device searches the hypotheses in an increasing order or a decreasing order, there can be more than one change of sign values between two neighbor hypotheses. As shown in the example above, the transition from hypothesis index 1 to hypothesis index 2, both signs change in value (e.g., by toggling). As such boundary sample changes that involve toggling of both signs may need to be accounted for in hypothesis reconstruction.

To take into account the two-sign toggling of certain boundary samples, video encoder 22 may implement the hypothesis searching order aspects of this disclosure according to one or more of the techniques described below. To reduce the complexity, according to aspects of this disclosure, video encoder 22 may implement the searching order following a Gray code. According to the Gray code-based sign assignment, video encoder 22 may search the four hypotheses according to the following sign-index assignments:

Hypothesis index 0: {0, 0}
Hypothesis index 1: {0, 1}
Hypothesis index 2: {1, 1}
Hypothesis index 3: {1, 0}

As shown above, the Gray code-based hypothesis assignment of this disclosure results in only one sign value being toggled when transitioning between two neighboring hypotheses. In this way, based on the boundary sample values generated for a previous hypothesis, video encoder 22 may, according to aspects of this disclosure, generate the boundary sample values for current hypothesis by always consider the change (toggle) incurred by only one sign. In this way, video encoder 22 may implement the techniques of this disclosure to reduce the complexity of hypothesis generation, and to regularize the cost calculation process, by incorporating the Gray code into the hypothesis searching order.

Figure 5:
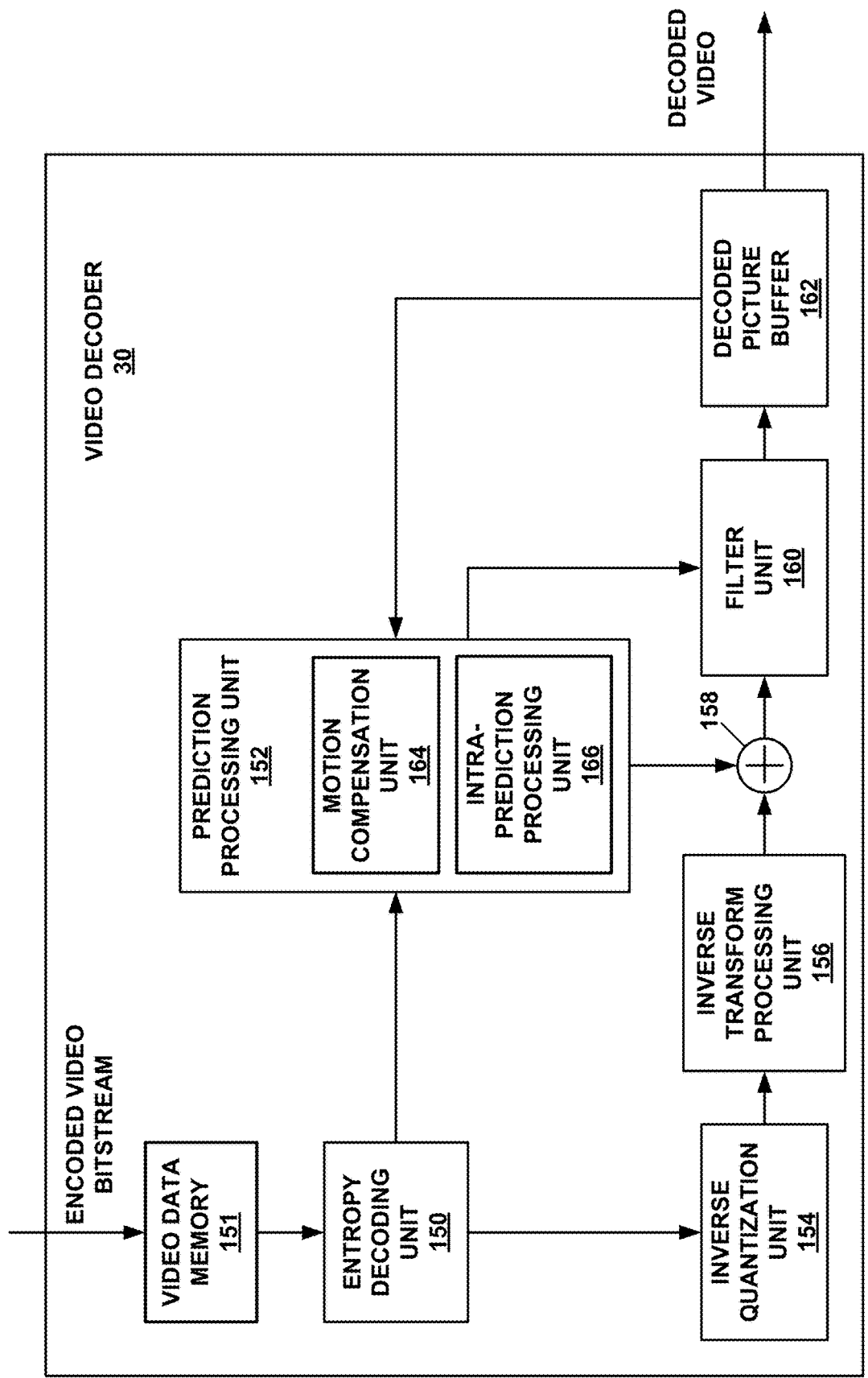
FIG. 5 is a block diagram illustrating an example of a video decoder configured to implement techniques of the disclosure.

FIG. 5 is a block diagram illustrating an example video decoder 30 that is configured to implement the techniques of this disclosure. FIG. 5 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 5, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit

166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118. In various examples, entropy decoding unit 150 may be configured to implement one or more techniques of this disclosure.

In accordance with some examples of this disclosure, entropy decoding unit 150 may determine a tree structure as part of obtaining the syntax elements from the bitstream. The tree structure may specify how an initial video block, such as a CTB, is partitioned into smaller video blocks, such as coding units. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

According to some aspects of this disclosure, video decoder 30 may use a pre-stored set of reconstructed residual samples to perform hypothesis reconstruction. Techniques of this disclosure by which video decoder 30 uses pre-stored reconstructed residual samples are generally referred to herein as "template-based reconstruction" techniques, and may represent decoder-side operations corresponding to the template-based reconstruction techniques described above with respect to video encoder 22. In some instances of template-based reconstruction according to aspects of this disclosure, video decoder 30 may store one or more fully-reconstructed and/or partially-reconstructed residual blocks, and then use some combination (e.g., a linear combination) of the stored information to form a template.

For instance, the pre-stored reconstructed residual samples may be stored to any memory accessible (e.g., via direct or indirect communicative coupling) to processing circuitry of video decoder 30, such as storage media 28 of destination device 14 and/or video data memory 151. In turn, video decoder 30 may use the template to derive all of the possible reconstructed values. Each stored set of residual blocks may be pre-calculated using a pre-defined transform coefficient block. To perform hypothesis reconstruction, video decoder 30 may identify a selected group of fully- and/or partially-reconstructed residual blocks the stored set, and generate/estimate the hypothesis reconstruction using some combination the reconstructed residual blocks identified in this fashion.

As discussed above, video decoder 30 (and/or components thereof) may be configured, according to aspects of this disclosure, to mitigate various issues associated with existing sign prediction technology. According to some examples of the template-based reconstruction techniques of this disclosure, video decoder 30 may form each reconstructed block of the stored set using a pre-defined quantized transform coefficient block (TB), a given dequantization parameter, and a given primary transform and/or a given secondary transform. An example is discussed below with respect to a particular coefficient, for which the position is denoted as $f(x,y)$ in an M×N TB, where $0<=x<M$, $0<=y<N$. Given the inverse transform method (including primary transform and/or secondary transform) and dequantization parameter, video decoder 30 may generate a quantized coefficient block (denoted as B) by setting $f(x,y)$ to a certain value, and by setting all other coefficients to a different value from the value assigned to $f(x,y)$. For example, video decoder 30 may set the value of $f(x,y)$ to one (1), and may set all other coefficients to zero (0).

In turn, video decoder 30 may pre-calculate a fully- or partially-reconstructed residual block (denoted as R) by applying the given dequantization and inverse transform on the quantized coefficient block B. Video decoder 30 may pre-store the reconstructed residual block R to a memory (e.g., to storage media 28 of destination device 14 and/or to video data memory 101). By pre-storing the partially- or fully-reconstructed block R, video decoder 30 may leverage existing resources (e.g., in the form of storage media 20 and/or video data memory 151) to cache pre-calculated information that can be used to improve the efficiency of calculations to be performed at a later stage. In this manner, during sign prediction operations, if the sign of coefficient $f(x,y)$ needs to be predicted in an M×N TB with the same inverse transform and dequantization parameter, the techniques of this disclosure enable video decoder 30 to avoid performing an inverse transform for $f(x,y)$. Instead, video decoder 30 may scale the pre-stored reconstructed residual block R by a factor of $|f(x,y)|$ and then use the scaled version of the pre-stored reconstructed residual block R to estimate the reconstructed block.

In another example of the template-based reconstruction techniques of this disclosure, video decoder 30 may pre-store a dequantized version of the TB. That is, in these examples, video decoder 30 may reconstruct the current block using dequantized versions of the (fully or partially) reconstructed blocks stored to storage media 28. In other words, according to these examples, video decoder 30 may reconstruct the current block using a pre-defined dequantized TB, and one or both of a given primary transform or a given secondary transform.

One use-case scenario of the dequantized TB-based implementations of the template-based reconstruction techniques of this disclosure is described below with respect to a particular coefficient $f(x,y)$ in an M×N TB, where $0<=x<M$, $0<=y<N$, given the inverse transform method (including primary transform and/or secondary transform). In this example, video decoder 30 may generate a dequantized coefficient block B by setting $f(x,y)$ to a certain value, and by setting all other coefficients to another value. For instance, video decoder 30 may set $f(x,y)$ to a value of one (1), and may set all of the remaining coefficients to a value of zero (0). In turn, video decoder 30 may pre-calculate a fully or partially reconstructed residual block R by applying the given inverse transform on B, and may pre-store the reconstructed residual block R to a memory (e.g., to storage media 28 and/or video data memory 151).

In this way, during sign prediction, if the sign of the quantized coefficient $f(x,y)$ needs to be predicted in an M×N TB with the same inverse transform, the techniques of this disclosure enable video decoder 30 and/or video decoder 30 to avoid doing inverse transform for $f(x,y)$. Instead, video decoder 30 may first dequantize the quantized coefficient $f(x,y)$ to be $f(x,y)'$ (to denote the dequantized coefficient), then video decoder 30 ma scale the pre-stored reconstructed residual block R by a factor of $|f(x,y)'|$. Video decoder 30 may then use the scaled version (i.e., scaled using the dequantized value) of the pre-stored dequantized reconstructed residual block R to estimate the reconstructed block. As illustrated in the discussion above, video decoder 30 may implement the template-based reconstruction techniques of this disclosure by optionally using dequantized TB information for the pre-stored template, with varying computation complexity arising from the optional use or non-use of the dequantization operations.

In some implementations of the template-based reconstruction techniques of this disclosure, video decoder 30 may pre-store the set of partially- and/or fully-reconstructed residual blocks with fractional precision. In some examples, video decoder 30 may first scale the set of reconstructed residual blocks with a pre-defined factor (e.g., 2, 4, 8, 16, etc.), and then round the result to the nearest integer, and store the rounded, scaled result to storage media 28 and/or video data memory 151. In this way, video decoder 30 may enhance the precision of the pre-stored reconstructed residual blocks. Moreover, in both the fractional precision implementations and the scaling/rounding based implementations described above, video decoder 30 may avail of the benefits of the template-based reconstruction techniques of this disclosure, while reducing the memory requirements with respect to storage media 28 and/or video data memory 151.

According to some implementations of the template-based reconstruction techniques of this disclosure, video decoder 30 may pre-store the set of fully- and/or partially-reconstructed residual blocks with clipped values. In some instances, video decoder 30 may clip the values of the reconstructed residual blocks before storage, such that the clipped values fit a restricted bit range of representation. For example, by clipping the values using constraints of a minimum value (Vmin) of negative eight (−8) and a maximum value (Vmax) of seven (7), video decoder 30 may form the entries of the pre-stored reconstructed residual values such that all of the pre-stored reconstructed residual values can be represented using, at most, four (4) bits. In various use-case scenarios, video decoder 30 may utilize one or more of the factional precision implementation, the scaling/rounding implementation, or the clipping-based implementations of the template-based reconstruction techniques individually or in any combination, in accordance with various aspects of this disclosure.

In some examples of the template-based reconstruction techniques of this disclosure, video decoder 30 may use a linear combination of certain identified reconstructed residual blocks of the stored reconstructed residual blocks to reconstruct the current TB. For example, the linear combination may represent a weighted sum of the identified stored reconstructed residual blocks. To calculate the weighted sum, video decoder 30 may determine the respective weights using the magnitude (also referred to as 'level value') of a quantized or dequantized (as the case may be) transform coefficient for which the sign is being predicted. By using a weighted sum of multiple stored reconstructed residual blocks, video decoder 30 may improve hypothesis precision by utilizing data from multiple previously-reconstructed blocks.

Video decoder 30 may, in some examples, implement template-based reconstruction techniques of this disclosure in a manner that makes us of offline computation. Because different transform and/or quantization methods may be available to video decoder 30, video decoder 30 may need to store multiples of reconstructed blocks for a single quantized coefficient block. To mitigate storage requirements and to ease the resource consumption of accessing the pre-calculated residual blocks, video decoder 30 may avail of offline computation capabilities. For instance, video decoder 30 may perform a merging process on the pre-stored residual blocks, such that multiple residual blocks are merged and represented by one residual block. In some examples, video decoder 30 may pre-define a function $f$ to derive one pre-stored residual block from another pre-stored residual block, such that only one of several residual blocks may need to be stored. That is, in these examples, video decoder 30 may store one residual block, and may derive other residual blocks using the pre-defined function $f$ and the single stored residual block.

In some implementations of the template-based reconstruction techniques of this disclosure, video decoder 30 may store pre-calculated residual blocks to off-chip memory (also referred to as "external" memory) of source device 12. The total size of the set of pre-calculated residual blocks may, in some instances, be large, and therefore may be difficult to store in on-chip memory. To continue using the template-based reconstruction techniques of this disclosure while operating within the available storage constraints, video decoder 30 may pre-store the set of pre-calculated residual blocks to off-chip memory, which, in some examples, tends to represent a cheaper memory than on-chip memory. In these implementations, video decoder 30 may only load the residual blocks, as needed, to on-chip memory. For instance, video decoder 30 may load the residual blocks once per bigger block or bigger picture area, such as for a largest coding unit (LCU).

According to some implementations of the template-based reconstruction techniques of this disclosure, video decoder 30 may use each of the pre-stored set of partial residual blocks as a template for sign prediction. In some examples, video decoder 30 may store only the leftmost and topmost residual pixels are stored for the pre-calculated residual blocks. In one example, video decoder 30 may store the top-left residual pixel, in addition to one or more residual pixels of the top row (starting from the residual pixel positioned immediately right of the top-left residual pixel) and/or one or more residual pixels of the leftmost column (starting from the residual pixel positioned immediately below of the top-left residual pixel). In some examples, video decoder 30 may apply the template-based sign prediction process described in Henry in conjunction with the pre-stored set of partial residual blocks (of this disclosure) in such a way that the template is not generated by doing partial inverse transform on the fly. Instead, video decoder 30 may generate the template by accessing the pre-stored set of partial residual blocks, and performing a scaling operation.

Video decoder 30 may, in some examples, be configured according to aspects of this disclosure to perform selective sign prediction. For instance, video decoder 30 may perform selective sign prediction with respect to lower-frequency transform coefficients. Video decoder 30 may also perform selective sign prediction to avoid sign prediction for outlier block sizes (e.g. very large or very small block sizes). Examples of outlier dimensions that video decoder 30 may use in accordance with the techniques of this disclosure are discussed below. To perform the selective sign prediction techniques of this disclosure, video decoder 30 may determine various conditions under which sign prediction is to be performed or alternatively skipped. Various conditions for the selective sign selection aspects of this disclosure are described in the following paragraphs.

Video decoder 30 may apply several of the conditions for the selective sign prediction aspects of this disclosure on a block-wide basis. These conditions may relate to various features including, but not limited to, the block width, block height, block area (also referred to as "size"), transform coefficient frequency locations, last position, intra prediction mode, whether only a primary transform is used to code a block, whether only particular transform functions or certain transform subset are used for coding the block, inverse transform method, whether the block is intra coded or inter coded blocks, or any other decoded information of the current and/or neighbor block(s).

According to some implementations of the selective sign prediction techniques of this disclosure, video decoder 30 may not apply sign prediction if either the width of the currently-decoded block or the height of the currently-decoded block is larger than a pre-defined threshold. In contrast, according to existing sign prediction technology, sign prediction would be applied regardless of the block width or height, as the case may be. In some examples, the threshold may be configurable, and video decoder 30 may receive the threshold in an encoded video bitstream signaled by video encoder 22. In various examples, video decoder 30 may set the threshold (using the signaled information or otherwise) to values including, but not limited to 4, 8, 16, 32, or 64.

In some examples of the selective sign prediction techniques of this disclosure, video decoder 30 may configure the threshold value to be dependent on coding modes according to which the block was encoded (and reciprocally, that video decoder 30 may use to decode the encoded block). For example, video decoder 30 may configure the threshold to be different for intra-coded blocks and inter-coded blocks. In one example, video decoder 30 may set the threshold value to 32 for intra-coded blocks, while setting the threshold value to 64 for inter-coded block. In some examples, video decoder 30 may not apply sign prediction if the minimum or maximum of block width or block height exceeds a threshold.

According to some examples of the sign prediction techniques of this disclosure, video decoder 30 may not apply sign prediction for transform coefficients that are not located in the top-left K×L part of a TB. K×L may represent a square sub-block of the TB, such as a sub-block having a dimensionality of 2×2, 3×3, 4×4 or 8×8, etc. In contrast, according to existing sign prediction technology, sign prediction would be applied for transform coefficients positioned outside of the top-left K×L portion of the TB. In some examples, the values of K and/or L may further depend on coding modes and/or quantization parameters. In the specific example of the K×L portion of the TB representing a 2×2 sub-block, there may be only four (4) possible sign predictions.

In some implementations of the selective sign prediction techniques of this disclosure, video decoder 30 may limit the inverse transform performed in the sign prediction process to certain inverse transform(s). For example, video decoder 30 may impose the inverse transform constraint while generating a hypothesis during the hypothesis prediction process. The selected transform(s) can be different from the inverse transform which video decoder 30 applies to generate the actual reconstructed block after deriving the actual coefficient signs.

In one such example, video decoder 30 may only use discrete cosine transform type-II (DCT-II) as the primary inverse transform during sign prediction. In another such example, during sign prediction, video decoder 30 may replace the secondary transform with a transform using a pre-defined permutation matrix. The pre-defined permutation matrix may include entities of "+1" and "−1". In another example, video decoder 30 may not use a secondary transform during sign prediction.

According to some examples of the selective sign prediction techniques of this disclosure, video decoder 30 may apply sign prediction only for those encoded blocks that were encoded using only a primary transform. By limiting sign prediction in this manner, video decoder 30 may reduce coding complexity, such that the complexity of the inverse transform may be smaller than the complexity arising from having a primary and a secondary transform applied together. In another example, video decoder 30 may apply sign prediction only for those encoded blocks that were encoded using a certain transform core or certain transform set/subset. Limiting sign prediction in this manner may yield potential benefits because it is possible that sign prediction may not work efficiently for all transform basis/cores, and coding complexity can thereby be reduced by limiting the application of sign prediction in this way.

Some aspects of this disclosure are directed to techniques for cost function measurement. According to the cost function measurement aspects of this disclosure, video decoder 30 may utilize previously-decoded information (obtained via the decoding loop) to measure the cost function for each hypothesis reconstruction. The previously-decoded information that video decoder 30 may leverage for cost function measurement includes, but is not limited to, the width of the current block, the height of the current block, the current block's area (also referred to as "size" herein), transform coefficient frequency locations, a last position, an intra prediction mode used for encoding the block, whether the evaluated block(s) are intra-coded or inter-coded, or any decoded information of the current and/or neighbor block(s).

In some examples, video decoder 30 (or one or more components thereof) may implement the cost function measurement aspects of this disclosure by measuring a difference between reconstructed samples of the neighboring block(s) and the reconstructed samples of the current block located along the boundary. The measured difference is also referred to herein as a "gradient" to illustrate that a difference can be expressed as the slope at a given point of a curve. That is, instead of measuring the first order information representing the sample values, video decoder 30 may implement the cost function measurement techniques of this disclosure to measure second order (difference or gradient) information that is comparative between the neighboring reconstructed samples and the reconstructed samples of the current block positioned along the boundary.

According to this implementation, video decoder 30 may generate estimated boundary residual samples by subtracting the neighboring reconstructed samples from the prediction samples located at the current block boundary (or vice versa). That is, video decoder 30 may use the subtraction operation(s) to obtain the second order information represented by the difference between the estimated boundary residual samples and the candidate boundary residual samples. For each candidate combination of signs, the generated residual samples represent a set of "candidate residual samples." By using the second order gradient information between the neighboring residual samples and the boundary-interfacing residual samples of the current block, video decoder 30 may avoid instances of duplicate reconstruction processes, in which the same prediction samples are used to produce candidate residual samples multiple times. In this way, techniques of this disclosure enable video decoder 30 to reduce computing resource consumption that would otherwise be expended for redundant candidate residual sample generation. In this way, video decoder 30 may also reduce bandwidth requirements by reducing the need for video encoder 22 to signal the redundant candidate residual sample information in an encoded video bitstream.

In some examples of the cost function measurement techniques of this disclosure, video decoder 30 may be configured to measure the pixel value difference (also referred to herein as a "pixel gradient value") along an intra-prediction direction to measure the cost function. In one such example, video decoder 30 may pre-select a partial subset of allowed intra prediction directions, and may map each allowed intra prediction direction to one of the pre-selected intra directions which can be used to approximate the intra prediction direction. In this example, video decoder 30 may measure the pixel value difference along the mapped direction in the cost function calculation.

In cases where the intra prediction direction is not available to video decoder 30 (e.g., if one of the evaluated blocks is inter-coded), video decoder 30 may instead derive an intra prediction mode. Video decoder 30 may derive the intra prediction mode from the spatial neighboring coded blocks, or a block identified by a motion vector in a coded picture. If the intra prediction direction points to a fractional position, video decoder 30 may apply an interpolation process to derive the value of the fractional position. Video decoder 30 may apply the interpolation filter used for generating the intra-predicted block, or may use a different (e.g., simpler) interpolation filter instead.

According to some of the cost function measurement aspects of this disclosure, video decoder 30 may measure the cost function using a second or higher order (N-th order, where 'N' represents an integer value of two or greater) order of the pixel value difference. For instance, video decoder 30 may use multiple reference lines (e.g., two or more) to measure the cost value. The number of reference lines that video decoder 30 uses for measuring the cost value may depend on coded information, including, but not limited to, the intra prediction mode and/or neighboring reconstructed values. Video decoder 30 may, in some instances, set the maximum number of reference lines to be equal to the required number of reference lines for intra prediction.

According to some implementations of the cost function measurement aspects of this disclosure, video decoder 30 may exclude some pixels from the cost function measurement operations, depending on whether one or more given criteria are satisfied. In one example, video decoder 30 uses a criterion of whether the absolute value of a first order, second order (gradient), or N-th order derivative is less than a given threshold value. In another example, video decoder 30 uses a criterion of whether the neighboring reconstructed samples used to calculate the N-th order derivative is available. In another example still, video decoder 30 uses a criterion of whether identity transform or transform skip is applied to the horizontal or vertical transform.

According to some implementations of the cost function measurement aspects of this disclosure, video decoder 30 may, when measuring the cost using neighboring reconstructed values, calculate the cost values for multiple directions. That is, video decoder 30 may calculate the cost values for multiple directions instead of calculating the first order, second order (gradient), or N-th order differences along a fixed or pre-defined direction (e.g., horizontal direction for a left block boundary and vertical direction for a top block boundary). Rather, according to these implementations, video decoder 30 calculates the cost values for multiple directions, and uses the minimum cost for measuring the cost.

In some examples of the cost function measurement techniques of this disclosure, for relatively larger block sizes, video decoder 30 may calculate the cost function using a downsampled hypothesis reconstruction. By using a downsampled hypothesis reconstruction for cost function measurement, video decoder 30 may reduce the complexity of cost function application with respect to larger block sizes. According to some of the cost function measurement techniques of this disclosure, video decoder 30 may measure the pixel value difference only for partial pixels in the reconstructed block and neighbor block(s). Partial pixels may be, for example, corner pixels. Errors typically tend to be larger for corner pixels. In another example, video decoder 30 may exclude the corner pixels from the difference measure based on the corner pixels being potential outliers, or may assign different weights to the selected pixels.

According to some implementations of the cost function measurement aspects of this disclosure, video decoder 30 may determine the number of predicted signs (e.g., 0, 1, 2, 3, 4, 5, 6, etc.) in a way that the number of predicted signs depends on previously-decoded information. Non-limiting examples of previously-decoded information that video decoder 30 may use in determining the number of predicted signs include, but are not limited to, intra prediction mode, block width/height, block size (area), QP, color components, temporal layer, whether the block is intra-coded or inter coded, whether transform skip or identity transform is applied, whether non-separable secondary transform is applied, quantized coefficients, the presence/value of an enhanced multiple transform (EMT) index, or the presence/value of a position-dependent prediction combination (PDPC) flag or index.

According to some implementations of the cost function measurement aspects of this disclosure, video decoder 30 may, when multiple 'M' signs are to be predicted, perform sign prediction in a unit or group manner. That is, video decoder 30 may perform sign prediction for a group, instead of testing all the possible 2^M hypothesis reconstructions, where the 'M' signs are divided into 'N' groups. Video decoder 30 may predict each group of signs by setting the remaining groups of signs as previously-predicted values or default value, if the remaining group of signs have not yet been predicted. Video decoder 30 may iterate the group-based sign prediction process for multiple rounds until a pre-defined limitation is met. Video decoder 30 may predict a group of signs with larger transform coefficient levels prior to predicting a group of signs with relatively lower coefficient levels. Video decoder 30 may terminate the iterations when the predicted signs for each group no longer change, or the iteration number has met a pre-defined threshold value, or the cost difference between iterations (for example, succeeding iterations) has stopped exceeding a certain threshold.

The following paragraphs describe aspects of this disclosure that generally relate to the selection of coefficient signs to be predicted. According to the coefficient sign selection aspects of this disclosure, video decoder 30 may select predicted transform coefficients by utilizing already-available decoded information (e.g., via a decoding loop implemented by video decoder 30). The previously-decoded information that video decoder 30 may use for coefficient sign selection includes, but is not limited to, one or more of the width of the current block, the height of the current block, the area (also referred to as "size") of the current block, transform coefficient frequency locations within the current block, last position, an intra prediction mode according to which the current block the current and/or neighboring block(s) were encoded, whether sign data hiding is applied with respect to the current and/or neighboring block(s), whether the current and/or neighboring block(s) were intra-coded or inter-coded, or any decoded information of the current and/or neighbor block(s). In various examples, video decoder 30 (or one or more components thereof) may implement the coefficient sign selection aspects of this disclosure such that the maximum number of predicted signs depends on whether the current block is inter-coded or intra-coded. In some examples, video decoder 30 may set the maximum number of predicted signs based on inverse transform method (e.g., which primary and/or secondary transform) is applied for dequantizing the block.

In some examples, video decoder 30 may apply sign hiding even when sign prediction is applied the block (TB). In these examples, video decoder 30 may hide the sign of the last nonzero coefficient in the forward scanning order, instead of hiding the first nonzero coefficient in the forward scanning order. Furthermore, in some such examples, video decoder 30 may not perform sign data hiding at the CG-level. That is, in these instances, consecutive nonzero coefficients, even if located in different CGs, may be jointly considered for sign data hiding.

In some examples, video decoder 30 may pre-define several threshold values (denoted by $t_0, t_1, \ldots, t_N$) where $t_0 > t_1 > \ldots > t_N$. In these examples, video decoder 30 may derive several intervals as $(t_0, +\infty)$, $[t_1, t_0)$, $[t_N, t_{N-1})$ in descending order. Moreover, video decoder 30 may compare dequantized coefficient levels to each one of the given intervals until video decoder 30 identifies or detects one interval which covers the dequantization coefficient level. Video decoder 30 may identify the signs of coefficients as predicted signs, according to the descending order of the threshold values.

For instance, video decoder 30 may first place the signs for coefficients in the interval $(t_0, +\infty)$ into the list of predicted signs, and then place the signs for coefficients in the interval $[t_1, t_0)$ into the list of predicted signs. Video decoder 30 may iterate this process continues for each interval in descending order until the number of predicted signs reaches the pre-defined maximum number of predicted signs, or video decoder 30 has checked all available intervals. If video decoder 30 determines that a coefficient has a level less than $t_N$, video decoder 30 may not consider the sign to be a predicted sign. $(600, +\infty)$, $[300, 600)$ represents a common or even typical setting. Video decoder 30 may not consider the signs of dequantized coefficient levels being less than 300 as predicted signs, in this example.

Some aspects of this disclosure are directed to determining the CABAC context for coding coefficient signs. That is, according to these techniques, video decoder 30 may define context values for the signs, by setting different contexts for different intervals of coefficient levels. Again, intervals can vary based on various features. The context value that video decoder 30 uses encoding coefficient signs may depend on the dequantized level (e.g., the absolute value) of the corresponding coefficient. Video decoder 30 may pre-define several intervals, and may determine one of the context values using the index of interval to which the dequantized level value belongs.

A common or even typical setting of intervals are (0, 600), [600, +∞), or (0, 600], (600, +∞). With this interval setting, if the coefficient level falls in the range of (0, 600), then video decoder 30 may set the context value to zero (0). Otherwise (i.e., if the coefficient level falls outside of the (0, 600) range), video decoder 30 may set the context value to one (1). In various examples, video decoder 30 (or one or more components thereof) may implement the CABAC context determination aspects of this disclosure to determine the intervals as being dependent on previously-decoded information, including, but not limited to, one or more of the QP for the block, the block area ("size"), block width, or block height.

Various aspects of this disclosure are directed to a searching order for a hypothesis, such as for one of the two hypotheses that video decoder 30 may form during a hypothesis reconstruction for a block. Again, each hypothesis consists of one possible combination of candidate sign values. For example, if video decoder 30 predicts two signs, video decoder 30 may need to form a total of four hypotheses. That is, in the two-sign scenario, video decoder 30 may form four possible combinations of candidate sign values, including the following:

Hypothesis index 0: {0, 0}
Hypothesis index 1: {0, 1}
Hypothesis index 2: {1, 0}
Hypothesis index 3: {1, 1}, where the first digit indicates the first predicted sign, and the second digit indicates the second predicted sign. In the examples above, zero (0) indicates a positive sign, while one (1) indicates a negative sign. The combination of candidate sign values in each hypothesis corresponds to the binarized representation of the hypothesis index. For example, a {1, 1} combination yields the hypothesis index of three, because the 2^0 bit and the 2^1 bit are both set to '1' values. If a coding device searches the hypotheses in an increasing order or a decreasing order, there can be more than one change of sign values between two neighbor hypotheses. As shown in the example above, the transition from hypothesis index 1 to hypothesis index 2, both signs change in value (e.g., by toggling). As such boundary sample changes that involve toggling of both signs may need to be accounted for in hypothesis reconstruction.

To take into account the two-sign toggling of certain boundary samples, video decoder 30 may implement the hypothesis searching order aspects of this disclosure according to one or more of the techniques described below. To reduce the complexity, according to aspects of this disclosure, video decoder 30 may implement the searching order following a Gray code. According to the Gray code-based sign assignment, video decoder 30 may search the four hypotheses according to the following sign-index assignments:

Hypothesis index 0: {0, 0}
Hypothesis index 1: {0, 1}
Hypothesis index 2: {1, 1}
Hypothesis index 3: {1, 0}

As shown above, the Gray code-based hypothesis assignment of this disclosure results in only one sign value being toggled when transitioning between two neighboring hypotheses. In this way, based on the boundary sample values generated for a previous hypothesis, video decoder 30 may, according to aspects of this disclosure, generate the boundary sample values for current hypothesis by always consider the change (toggle) incurred by only one sign. In this way, video decoder 30 may implement the techniques of this disclosure to reduce the complexity of hypothesis generation, and to regularize the cost calculation process, by incorporating the Gray code into the hypothesis searching order.

Figure 6:
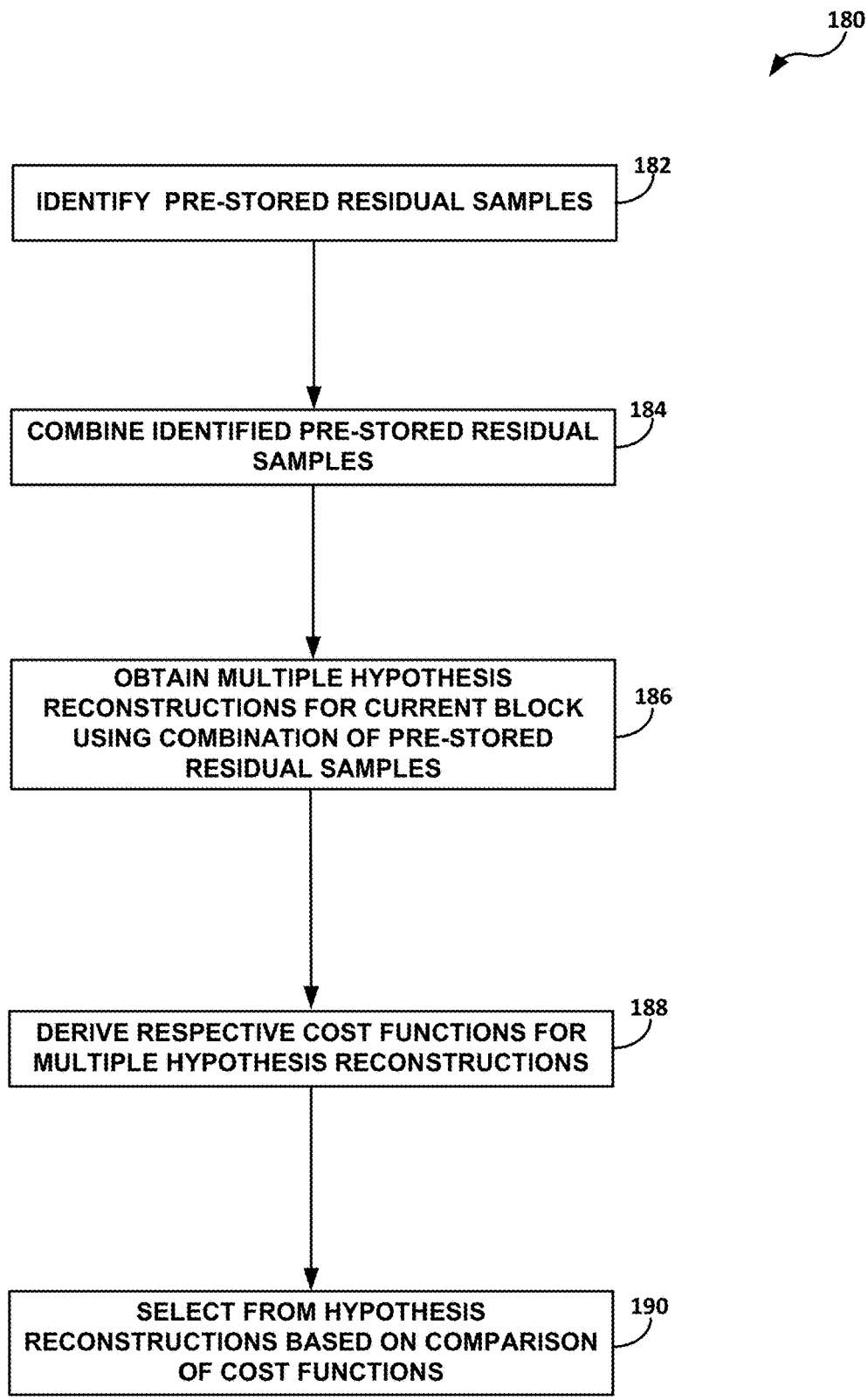
FIG. 6 is a flowchart illustrating an example process by which a video coding device may perform template-based reconstruction techniques of this disclosure as part of a hypothesis reconstruction for a current block.

FIG. 6 is a flowchart illustrating an example process 180 by which a video coding device may perform template-based reconstruction techniques of this disclosure as part of a hypothesis reconstruction for a current block. Although a variety of video coding devices may perform process 180, FIG. 6 is described as being performed by video decoder 30 (and more specifically, processing circuitry thereof), as a non-limiting example. Process 180 may begin when processing circuitry of video decoder 30 identifies a set of pre-stored residual samples (182). For instance, the processing circuitry of video decoder 30 may identify the set of pre-stored residual samples within pre-stored video data available from video data memory 151. The pre-stored residual samples may, in some examples, be included in a full pre-stored block, or in partial blocks stored to video data memory 151.

In some examples, the pre-stored residual samples may represent hard-coded constants, may not belong to previously-reconstructed residual blocks. Rather, in these examples, the pre-stored residual samples may represent an approximation of reconstructed residual data, and not actual reconstructed residual data. In turn, the processing circuitry of video decoder 30 may combine the identified set of pre-stored residual samples (184). The processing circuitry of video decoder 30 may form the combination of the identified set of previously-reconstructed residual blocks by implementing a variety of combinatorial logic. In some examples, the processing circuitry of video decoder 30 may form a linear combination of the identified previously-reconstructed residual blocks. For instance, to form a linear combination of the identified set of previously-reconstructed residual blocks, the processing circuitry of video decoder 30 may calculate a weighted sum of the transform coefficient levels of the block.

Additionally, the processing circuitry of video decoder 30 may obtain multiple hypothesis reconstructions for the current block, using the combination of pre-stored residual samples (186). For instance, the processing circuitry of video decoder 30 may apply different signs or different combinations of signs to the combination of pre-stored residual samples to form each respective hypothesis reconstruction. In this way, the processing circuitry of video decoder 30 may implement the techniques of this disclosure to use pre-stored residual samples (which are also referred to as "stored templates") to perform hypothesis reconstruction with respect to a current block.

In turn, the processing circuitry of video decoder 30 may derive respective cost functions for multiple hypothesis reconstructions (188). Based on a comparison of the different cost functions derived for the multiple hypothesis reconstructions, the processing circuitry of video decoder 30 may select one of the hypothesis reconstructions (190). In this way, the processing circuitry of video decoder 30 may perform the template-based reconstruction techniques of this disclosure to perform hypothesis reconstruction for a current block of encoded video data, by leveraging stored information in the form of previously-reconstructed blocks stored to video data memory 151.

In some instances, each pre-stored residual sample of the identified set of pre-stored residual samples is included in a quantized transform coefficient block. In some examples, each pre-stored residual sample of the identified set of pre-stored residual samples is included in a dequantized transform coefficient block. According to some implementations in which each pre-stored sample is included in a dequantized transform coefficient block, video decoder 30 may assign a first absolute value to a first transform coefficient of each pre-stored residual sample of the set of pre-stored residual samples, and assign a second absolute value to all remaining transform coefficients of each pre-stored residual sample of the set of pre-stored residual samples except for the respective first transform coefficients that are assigned the first absolute value, the second absolute value being different from the first absolute value. In these examples, video decoder 30 may apply an inverse transform to each pre-stored residual sample of the set of pre-stored residual samples to form a set of dequantized reconstructed residual samples.

According to some implementations in which each pre-stored sample is included in a dequantized transform coefficient block, video decoder 30 may scale each dequantized residual sample of the set of dequantized residual samples using a dequantized value associated with each of the first transform coefficients, and may reconstruct the current block using the set of scaled dequantized residual samples. In some examples, one or more pre-stored residual samples of the identified set of pre-stored residual samples are stored at a fractional precision in the stored portion of the video data. In some examples, video decoder 30 may clip each pre-stored residual sample of the identified set of pre-stored residual samples using a pre-defined factor such that each clipped pre-stored residual sample can be represented using four (4) bits or less of data.

In some examples, to combine the set of pre-stored residual samples to form the combination of pre-stored residual samples, video decoder 30 may perform a linear combination of the set of pre-stored residual samples to form a linear combination of pre-stored residual samples. In some examples, to perform the linear combination of the set of pre-stored residual samples, video decoder 30 may calculate a weighted sum of the set of pre-stored residual samples, at least in part by assigning a respective weight to each pre-stored residual sample of the set of pre-stored residual samples. In some examples, to combine the set of pre-stored residual samples to form the combination of pre-stored residual samples, video decoder 30 may merge the set of pre-stored residual samples to form a single merged residual block, and may overwrite the set of pre-stored residual samples with the single merged residual block in a memory device.

According to some examples, video decoder 30 may derive a single residual block using one or more pre-stored residual samples of the identified set of pre-stored residual samples, and may overwrite the set of pre-stored residual samples with the derived single residual block in a memory device. In some examples, the stored portion of the video data including the set of pre-stored residual samples is stored to a first memory device, and video decoder 30 may load one or more pre-stored residual samples of the set of pre-stored residual samples from the first memory device to a second memory device on one of a once-per picture basis or a once-per largest coding unit (LCU) basis. The first memory device may represent an off-chip memory and the second memory device may be an on-chip memory. Again, off-chip memory generally represents a cheaper memory than on-chip memory.

Figure 7:
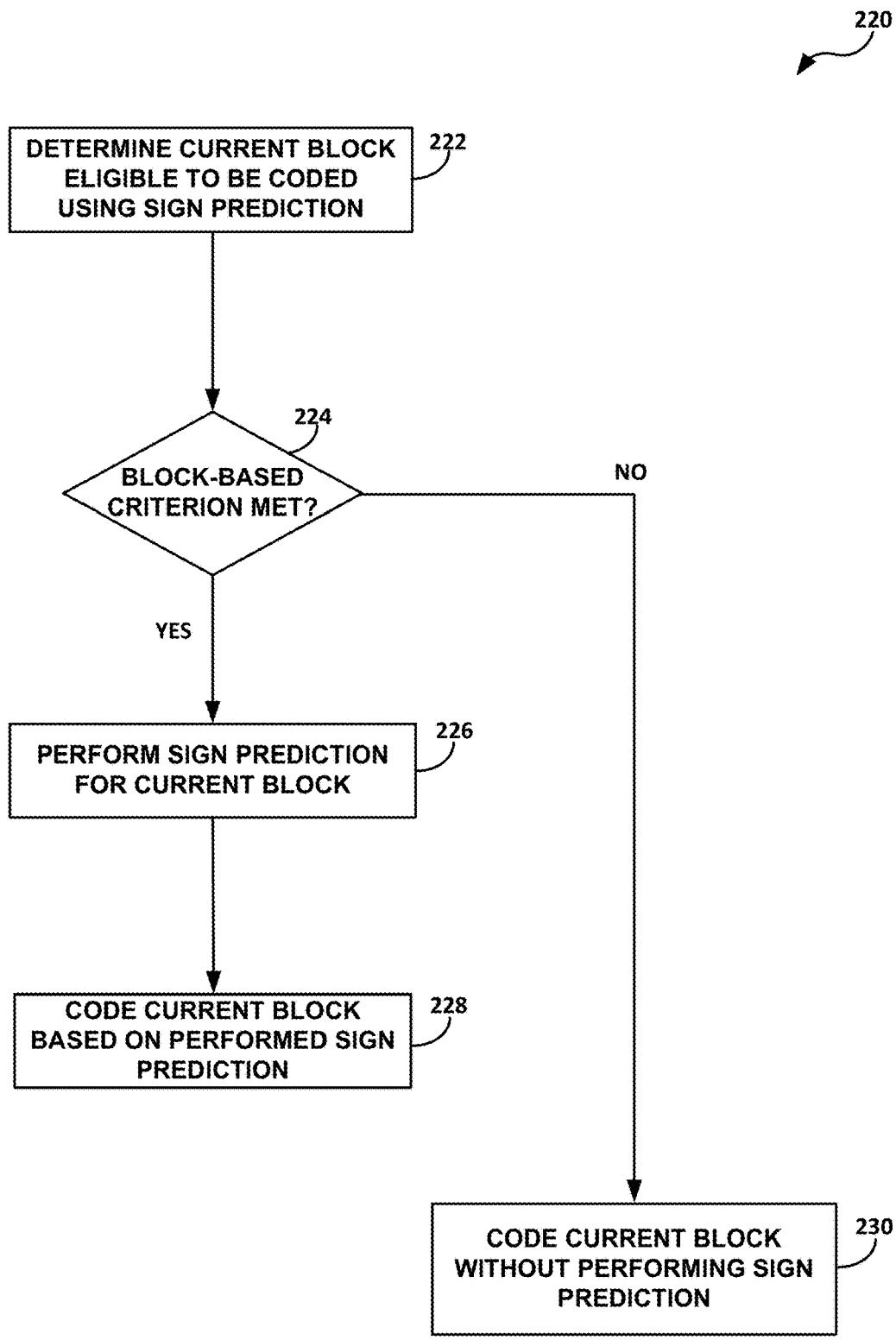
FIG. 7 is a flowchart illustrating an example process by which a video coding device may perform selective sign prediction techniques of this disclosure as part of coding a current block of video data.

FIG. 7 is a flowchart illustrating an example process 220 by which a video coding device may perform selective sign prediction techniques of this disclosure as part of coding a current block of video data. Although a variety of video coding devices may perform process 220, FIG. 7 is described as being performed by video decoder 30 (and more specifically, processing circuitry thereof), as a non-limiting example. Process 220 may begin when the processing circuitry of video decoder 30 determines that a current block of encoded video data is eligible to be decoded using sign prediction (222). In turn, the processing circuitry of video decoder 30 may determine whether or not the current block meets a block-based criterion (decision block 224).

In various examples, the processing circuitry of video decoder 30 may set the block-based criterion based on various factors, including, but not limited to, the width of the current block, the height of the current block, a coding mode according to which the current block is encoded, or a position of one or more sign-predicted transform coefficients within the current block. If the processing circuitry of video decoder 30 determines that the current block meets the predetermined block-based criterion (YES branch of decision block 224), then the processing circuitry of video decoder 30 may perform sign prediction with respect to the current block (226). In turn, the processing circuitry of video decoder 30 may code (in this example, decode) the current block based on the performed sign prediction (228). However, if the processing circuitry of video decoder 30 determines that the current block does not meet the predetermined block-based criterion (NO branch of decision block 224), then the processing circuitry of video decoder 30 may code (in this example, decode) the current block without performing sign prediction (230).

In some examples, the processing circuitry of video decoder 30 may determine that the block meets the predetermined criterion only if the width of the block is equal to or greater than a predetermined threshold width. In some examples, the processing circuitry of video decoder 30 may determine that the block meets the predetermined criterion only if the height of the block is equal to or greater than a predetermined threshold height. In some examples, the processing circuitry of video decoder 30 may determine that the block meets the predetermined criterion only if the sign-predicted transform coefficients are positioned in a top-left sub-block of the block.

According to some implementations in which the criterion is based on the transform coefficients positioned in the top-left sub-block, the top-left sub-block is a square sub-block. In various examples, the square sub-block may have a dimensionality of one of 2×2, 3×3, 4×4, or 8×8. In some instances of the square sub-block having the 2×2 dimensionality, the processing circuitry of video decoder 30 may perform the sign prediction using a total of four possible predicted signs.

In some examples, to code the video data, the processing circuitry of video decoder 30 may decode an encoded block of the video data. In some such examples, the processing circuitry of video decoder 30 may use a first inverse transform to perform a hypothesis reconstruction process with respect to the encoded block, select the sign prediction from a plurality of sign predictions based on the hypothesis reconstruction process, and reconstruct the encoded block using a second inverse transform that is different from the first inverse transform. In some such examples, the processing circuitry of video decoder 30 may receive data representative of the predetermined criterion in an encoded video bitstream. In these examples, video encoder 22 may signal the data representative of the predetermined criterion in the encoded video bitstream.

Figure 8:
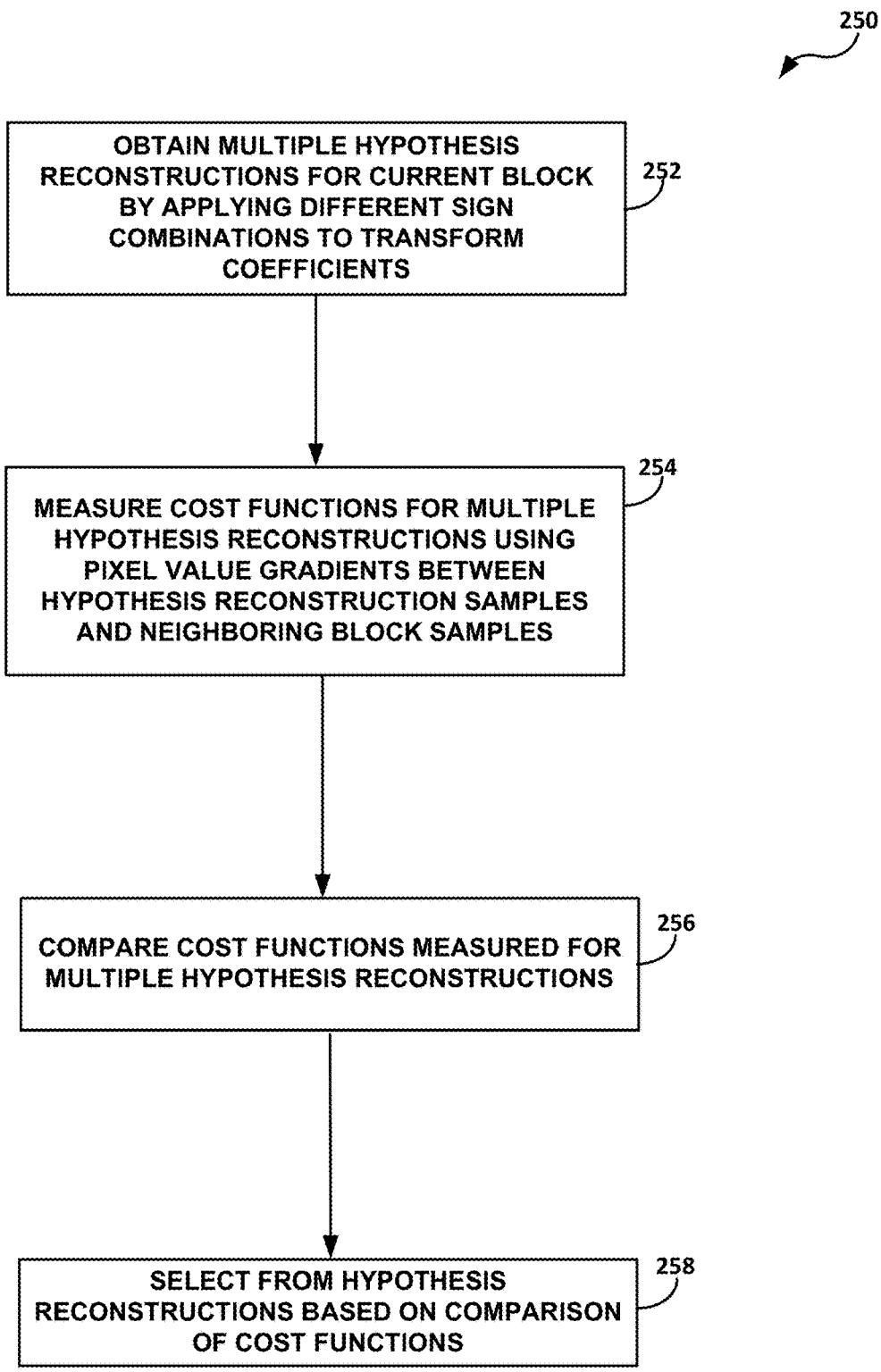
FIG. 8 is a flowchart illustrating an example process by which a video coding device may perform cost function measurement techniques of this disclosure as part of a hypothesis reconstruction for a current block.

FIG. 8 is a flowchart illustrating an example process 250 by which a video coding device may perform cost function measurement techniques of this disclosure as part of a hypothesis reconstruction for a current block. Although a variety of video coding devices may perform process 250, FIG. 8 is described as being performed by video decoder 30 (and more specifically, by processing circuitry thereof), as a non-limiting example. Process 250 may begin when video decoder 30 obtains multiple hypothesis reconstructions for a current block, by applying different sign combinations to transform coefficients of the current block (252). In an example use case scenario where video decoder 30 performs hypothesis reconstruction using two signs (0 and 1, for example), video decoder 30 may use a total of four sign combinations ({0,0}, {0,1}, {1,1}, and {1,0}) to obtain the multiple hypothesis reconstructions for the current block.

In turn, video decoder 30 may measure respective cost functions for the multiple hypothesis reconstructions using pixel value gradients between the samples of the hypothesis reconstructions and samples of one or more neighboring blocks (254). For instance, video decoder 30 may measure the respective cost functions by calculating second-order difference information (e.g. differential or derivative data) between absolute values of border samples of the hypothesis reconstructions and absolute values of the samples of the neighboring block(s). Video decoder 30 may compare the cost functions measured for the multiple hypothesis reconstructions against one another (256).

Based on the comparison of the different cost functions measured for the multiple hypothesis reconstructions, video decoder 30 may select one of the hypothesis reconstructions to use for decoding the current block (258). In this way, video decoder 30 may reduce redundancies, by implementing gradient-based cost measurement techniques of this disclosure.

In some examples, to determine the first set of pixel value gradients, the processing circuitry of video decoder 30 may determine second-order differences between absolute values of the samples of the first hypothesis reconstruction of the block and absolute values of the samples of the neighboring block. In these examples, to determine the second set of pixel value gradients, the processing circuitry of video decoder 30 may determine second-order differences between absolute values of the samples of the second hypothesis reconstruction of the block and absolute values of the samples of the neighboring block.

In some examples, the samples of the first hypothesis reconstruction of the block used for measuring the first cost function are positioned along a boundary between the first hypothesis reconstruction of the block and the neighboring block. In these examples, the samples of the second hypothesis reconstruction of the block used for measuring the second cost function are positioned along a boundary between the second hypothesis reconstruction of the block and the neighboring block. In some examples, the processing circuitry of video decoder 30 may apply a third sign combination to the transform coefficients of the block of the video data to obtain a third hypothesis reconstruction with respect to the block of the video data, and apply a fourth sign combination to the transform coefficients of the block of the video data to obtain a fourth hypothesis reconstruction with respect to the block of the video data.

In some such examples, the processing circuitry of video decoder 30 may use a Gray code order to search among the first hypothesis reconstruction, the second hypothesis reconstruction, the third hypothesis reconstruction, and the fourth hypothesis reconstruction. To use the Gray code to search, the processing circuitry of video decoder 30 may search according to the following order of sign combinations: {0, 0}, {0, 1}, {1, 1}, {1, 0}.

Aspects of this disclosure are discussed in bullet and sub-bullet form below. It will be appreciated, however, that aspects listed in the various bullets and sub-bullets below may be applied individually, or in any combination, in accordance with the techniques of this disclosure.

The bullets and sub-bullets listed below are generally directed to techniques of this disclosure that are applicable to a pre-stored set of reconstructed residual samples. According to these aspects of the disclosure, a set of fully or partially reconstructed residual blocks, each pre-calculated using a pre-defined transform coefficient block (explained in further detail below), are pre-stored for both video encoder 22 and video decoder 30. When doing a hypothesis reconstruction, a selected group of reconstructed residual blocks are identified from the set of stored reconstructed residual blocks, and the hypothesis reconstruction is generated or estimated using a combination, for example linear, of these identified stored reconstructed residual blocks.

a) Each of the stored set of reconstructed residual blocks may be a reconstructed block using a pre-defined quantized transform coefficient block, a given dequantization parameter, a given primary transform and/or a given secondary transform.

For example, for a particular coefficient f(x,y) in an M×N TB, where $0<=x<M$, $0<=y<N$, given the inverse transform method (including primary transform and/or secondary transform) and dequantization parameter, a quantized coefficient block B is generated by setting f(x,y) to a certain value, for example one (1), and all other coefficients are set to another value, for example zero (0), then a fully or partially reconstructed residual block R is pre-calculated by applying the given dequantization and inverse transform on B. The reconstructed residual block R is pre-stored in memory. In this way, during sign prediction, if the sign of coefficient f(x,y) needs to be predicted in an M×N TB with the same inverse transform and dequantization parameter, the techniques of this disclosure enable video encoder 22 and/or video decoder 30 to avoid doing inverse transform for f(x,y). Instead, the pre-stored reconstructed residual block R may be scaled by a factor of |f(x,y)| and then is used to estimate the reconstructed block.

b) Each of the set of stored reconstructed residual blocks may be the reconstructed block using a pre-defined dequantized transform coefficient block, a given primary transform and/or a given secondary transform.

For example, for a particular coefficient f(x,y) in an M×N TB, where $0<=x<M$, $0<=y<N$, given the inverse transform method (including primary transform and/or secondary transform), a dequantized coefficient block B is generated by setting f(x,y) to a certain value, for example one (1), and all other coefficients are set to another value, for example zero (0), then a fully or partially reconstructed residual block R is pre-calculated by applying the given inverse transform on B. The reconstructed residual block R is pre-stored in memory. In this way, during sign prediction, if the sign of quantized coefficient f(x,y) needs to be predicted in an M×N TB with the same inverse transform, the techniques of this disclosure enable video encoder 22 and/or video decoder 30 to avoid doing inverse transform for f(x,y). Instead, the quantized coefficient f(x,y) is first dequantized to be f(x,y)', then the pre-stored reconstructed residual block R may be scaled by a factor of |f(x,y)'| and then is used to estimate the reconstructed block.

c) The set of pre-stored reconstructed residual blocks may be stored with fractional precision, or equivalently, the set of reconstructed residual blocks may be stored by first scaling with a pre-defined factor, i.e., 2, 4, 8, 16, and rounded to the nearest integer. In this way, the precision of the pre-stored reconstructed residual blocks is increased.

d) The set of pre-stored reconstructed residual blocks may be stored with Clipped value to fit the restricted bit range of representation. For example, by applying Clipping with a minimum value Vmin=−8 and maximum value Vmax=7, the entries of all pre-stored reconstructed residual values can be represented in 4 bits. Bullets (c) and (d) can be applied jointly or individually, in addition with various other combinations of the techniques described in this disclosure.

e) In one example, a linear combination of these identified stored reconstructed residual blocks is a weighted sum of these identified stored reconstructed residual blocks, and the weights may be decided by the level value of a quantized or dequantized transform coefficient for which the sign is being predicted.

f) Because different transform and/or quantization methods may be available for video encoder 22 and video decoder 30, multiples of reconstructed blocks may need to be pre-stored for one particular quantized coefficient block, which may increase the burden of storing and accessing the pre-calculated residual blocks. To handle this issue, a merging process may be performed on the pre-stored residual blocks according to aspects of this disclosure, such that multiple residual blocks are merged and represented by one residual block.

Alternatively, a function $f$ is pre-defined to derive one pre-stored residual block from another pre-stored residual block, such that only one of several residual blocks may need to be stored and others are derived using the pre-defined function $f$ g) The total size of the set of pre-calculated residual blocks may be large, and may be difficult to be stored in on-chip memory. Alternatively, the set of pre-calculated residual blocks is pre-stored in external (e.g., cheaper) memory, and only the needed residual blocks are loaded to on-chip memory once per a bigger block or picture area, for example largest coding unit (LCU).

h) In one example, each of the pre-stored set of partial residual blocks is a template (e.g., only the leftmost and topmost residual pixels are stored) for sign prediction. The template based sign prediction process described in Henry can be applied in conjunction with the pre-stored set of partial residual blocks in a way that the template is not generated by doing partial inverse transform on the fly. Instead, the template is generated by accessing the pre-stored set of partial residual blocks and performing a scaling operation.

The bullets and sub-bullets listed below are generally directed to techniques of this disclosure that generally relate to conditions of using sign prediction. According to these aspects of this disclosure, several conditions may be applied for blocks which can apply sign prediction. These conditions may include, but are not limited to, the block width and height, block area size, transform coefficient frequency locations, last position, intra prediction mode, whether only primary transform is used to code a block, whether only particular transform functions or certain transform subset are used, inverse transform method, whether it is intra or inter coded blocks, or any other decoded information of the current and/or neighbor block(s).

a. In one example, sign prediction is not applied if either of block width or block height is larger than a threshold, where the threshold may be pre-defined. (Where otherwise, the sign prediction would be applied according to existing sign prediction technology). Alternatively, the threshold can be configurable and may be signaled. A typical threshold value can be, but is not limited to 4, 8, 16, 32, or 64.

Alternatively, the threshold value may be dependent on coded modes. In one example, the threshold may be different for intra and inter coded blocks. For example, for an intra coded block, the threshold value may be 32, while for an inter coded block, the threshold value may be 64.

Alternatively, sign prediction is not applied if the minimum or maximum of block width or block height is larger than a threshold.

b. In another example, sign prediction is not applied for transform coefficients which are not located in the top-left K×J part of a TB, where a typical setting of the K×J value can be 2×2, 3×3, 4×4 or 8×8, etc. (Where otherwise, the sign prediction would be applied according to existing sign prediction technology). Alternatively, the values of K and/or L may further depend on coded modes, and/or quantization parameters.

c. The inverse transform performed in the sign prediction process, for example to estimate the hypothesis, may be limited to certain inverse transform(s). The selected transform(s) can be different from the inverse transform to which is applied to generate the actual reconstructed block after the actual coefficient signs have been derived.

In one example, only discrete cosine transform to type-II (DCT-II) is used as the primary inverse transform during sign prediction.

In another example, during sign prediction, secondary transform is replaced by transform using pre-defined permutation matrix, and the pre-defined permutation matrix may include entities of "+1" and "−1".

In another example, secondary transform is not used during sign prediction.

d. In one example, sign prediction may be applied only for the blocks that use only primary transform. In this example, the complexity of the inverse transform may be smaller than the complexity arising from having a primary and a secondary transform applied together. In another example, sign prediction may be applied only for the blocks that use certain transform core or certain transform set/subset, because it is possible that sign prediction may not work efficiently for all transform basis/cores, and complexity can be reduced by limiting the sign prediction application.

The bullets and sub-bullets listed below are generally directed to techniques of this disclosure that generally relate to cost functions. According to these aspects of this disclosure, the cost function for measuring each hypothesis reconstruction may utilize other decoded information, including, but not limited to, the block width and height, block area size, transform coefficient frequency locations, last position, intra prediction mode, whether blocks are intra or inter coded blocks, or any decoded information of the current and/or neighbor block(s). In various examples, video encoder 22 and/or video decoder 30 (or one or more components thereof) may implement the cost function aspects of this disclosure according to one or more of the techniques listed below.

a. The cost function may be configured to measure the pixel value difference or pixel gradient value difference along the intra prediction direction.

a. In one example, a partial subset of allowed intra prediction directions are pre-selected, and each allowed intra prediction direction is mapped to one of the pre-selected intra directions which approximates the intra prediction direction. In addition, the pixel value difference along the mapped direction is measured in the cost function.

b. In case the intra prediction direction is not available (e.g., one block is coded with inter mode), a derived intra prediction mode may be used instead. The derived intra prediction mode may come from the spatial neighboring coded blocks, or a block identified by a motion vector in a coded picture.

c. When the intra prediction direction points to a fractional position, an interpolation process is applied to derive the value of that fractional position. The interpolation filter used for generating intra prediction block may be applied, or a different and/or simpler interpolation filter is used.

b. The cost function may be measured by the second order or N-th order of pixel value difference.

a. Multiple reference lines (e.g., more than 2) are used to measure the cost value.

b. The number of reference lines used for measuring the cost value may depend on coded information, including but not limited to intra prediction mode, neighboring reconstructed values.

c. The maximum number of reference lines may be set equal to the required number of reference lines for intra prediction.

c. Some pixels are excluded from measuring the cost value depending on a given criterion.

a. In one example, the criterion includes whether the absolute value of 1-st order, 2-nd order (gradient), or N-th order derivative is less than a given threshold value.

b. In another example, the criterion is whether the neighboring reconstructed samples used to calculate the N-th order derivative is available.

c. In another example, the criterion may include whether identity transform/transform skip is applied to the horizontal/vertical transform.

d. When measuring the cost using neighboring reconstructed values, instead of calculating the 1-st order, 2-nd order (gradient) or N-th order differences along a fixed or pre-defined direction (e.g., for left block boundary it is horizontal direction, for top block boundary, it is vertical direction), the cost values for multiple directions are calculated, and the minimum cost is used for measuring the cost.

e. For a larger block size, the cost function may use a downsampled hypothesis reconstruction, so that the complexity of applying cost function may be reduced for larger block sizes.

f. Pixel value difference may be measured only for partial pixels in the reconstructed and neighbor blocks. Those pixels can be, for example, corners, where typically error is larger, or those corner pixels can be excluded from the difference measure as potential outliers, or different weights can be assigned for those selected pixels.

g. Instead of measuring the 1st order, gradient (2nd order) difference between the neighboring reconstructed samples and the reconstructed samples located at the current block boundary, estimated boundary residual samples are generated by subtracting neighboring reconstructed samples and the prediction samples located at the current block boundary. Then the difference between the estimated boundary residual samples and the candidate boundary residual samples are measured. In this way, techniques of this disclosure can avoid a duplicate reconstruction process which needs to add the same prediction samples and different candidate residual samples. As used herein, the candidate residual samples refer to the residual samples generated using one candidate signs combination.

h. The number of predicted signs (e.g., 0, 1, 2, 3, 4, 5, 6) may depend on decoded/encoded information, including but not limited to intra prediction mode, block width/height, block size, QP, color components, temporal layer, intra/inter coded, whether transform skip/identity transform is applied, whether non-separable secondary transform is applied, quantized coefficients, EMT index, PDPC flag/index.

i. When multiple 'M' signs are to be predicted, instead of testing all the possible $2^M$ hypothesis reconstructions, the 'M' signs are divided into 'N' groups, then the sign prediction is performed in unit of group. Each group of signs are predicted by setting the remaining groups of signs as previously-predicted values or default value if they have not been previously predicted yet. This process can iterate several rounds until a pre-defined limitation is met.

The group of signs with larger transform coefficient levels are predicted prior to the group of signs with relatively lower coefficient levels.

The iteration may be terminated when the predicted signs for each group no longer change or the iteration number has met a pre-defined threshold value, or the cost difference between iterations (for example, succeeding iterations) is not exceeding a certain threshold.

The bullets and sub-bullets listed below are generally directed to techniques of this disclosure that generally relate to the selection of which coefficient signs will be predicted. According to these aspects of this disclosure, the selection of predicted transform coefficients may utilize other decoded information, including, but not limited to, the block width and height, block area size, transform coefficient frequency locations, last position, intra prediction mode, whether sign data hiding is applied, whether blocks are intra or inter coded blocks, or any decoded information of the current and/or neighbor block(s). In various examples, video encoder 22 and/or video decoder 30 (or one or more components thereof) may implement the coefficient sign selection aspects of this disclosure according to one or more of the techniques listed below.

a. Several threshold values, e.g., $t_0, t_1, \ldots, t_N$, where, for example, $t_0 > t_1 > \ldots > t_N$, may be pre-defined, and several intervals are derived as $(t_0, +\infty)$, $[t_1, t_0)$, $[t_N, t_{N-1})$ in a descending order. Dequantized coefficient levels are compared to each one of the given intervals until one interval which covers the dequantization coefficient level is identified. The signs of coefficients are identified as predicted signs according to the descending order. For example, the signs for coefficients in interval (to, +∞) are the first to be put into the list of predicted signs, then the signs for coefficients in interval $[t_1, t_0)$ are put into the list of predicted signs, and this process continues for each interval in descending order until the number of predicted signs reached the pre-defined maximum number of predicted signs, or all available intervals have been checked. If a coefficient has a level less than $t_N$, the sign may not be considered as a predicted sign. A typical setting of intervals can be (600, +∞), [300, 600), which means, for example, the signs of dequantized coefficient levels being less than 300 are not considered as predicted signs.
  a. In one example, the intervals are selected depending on coded information, including but not limited to the QP, and/or block size, block width, block height.
  b. A number of maximum predicted signs may depend on decoded information, e.g., whether the block is inter or intra coded, or inverse transform method (e.g., which primary/secondary transform is applied).
  c. When sign prediction is applied to a certain TB, sign data hiding may be still applied. In this case, instead of hiding the first nonzero coefficient in the forward scanning order, the sign of the last nonzero coefficient in the forward scanning order may be hidden. In one example, furthermore, the sign data hiding may not be performed at the CG-level. That is, consecutive nonzero coefficients, even if located in different CGs, may be jointly considered for sign data hiding.

Some aspects of this disclosure are directed to determining the CABAC context for coding coefficient signs. The context value for coding coefficient signs may depend on the dequantized level (absolute value) of the corresponding coefficient. Several intervals are pre-defined, one of the context value is decided by the index of interval which the dequantized level value belongs. A common or even typical setting of intervals are (0, 600), [600, +∞), or (0, 600], (600, +∞). With this setting, if the level if the level is in the range of (0, 600), the context value is 0, otherwise, the context value is 1. In various examples, video encoder 22 and/or video decoder 30 (or one or more components thereof) may implement the CABAC context determination aspects of this disclosure according to one or more of the techniques described below.
  a. The intervals depend on coded information, including, but not limited to the QP, and/or block size, block width, block height.

Some aspects of this disclosure are directed to a searching order for hypothesis. Each hypothesis consists of one possible combination of candidate sign values. For example, when 2 signs are predicted, there are totally 4 hypotheses (4 possible combination of candidate sign values) including:
  Hypothesis index 0: {0, 0}
  Hypothesis index 1: {0, 1}
  Hypothesis index 2: {1, 0}
  Hypothesis index 3: {1, 1},
where the first digit indicates the first predicted sign, and the second digit indicates the second predicted sign, 0 indicates positive sign and 1 indicates negative sign, and the combination of candidate sign values in each hypothesis corresponds to the binarized representation of the hypothesis index. It is noted that if a system searches the hypothesis in the increasing/decreasing order, there can be more than 1 change of sign values between two neighbor hypotheses, e.g., from hypothesis index 1 to index 2, there are two signs changing the values, this means that we need to consider the boundary samples change incurred by two signs.

In various examples, video encoder 22 and/or video decoder 30 (or one or more components thereof) may implement the hypothesis searching order aspects of this disclosure according to one or more of the techniques described below. To reduce the complexity, according to aspects of this disclosure, the searching order following the Gray code is applied:
  Hypothesis index 0: {0, 0}
  Hypothesis index 1: {0, 1}
  Hypothesis index 2: {1, 1}
  Hypothesis index 3: {1, 0} [H].

It can be noted that, by assigning the Gray code value for each hypothesis, there is only 1 change of sign values between two neighbor hypotheses. In this way, based on the generated boundary sample values of a previous hypothesis, for current hypothesis, to generate the boundary sample values, systems and techniques of this disclosure only consider the boundary samples change incurred by one sign. This reduces the complexity and regularize the cost calculation process.

Some aspects of this disclosure are directed to techniques for maximum-likelihood decoder-side estimation of transform coefficient signs for video coding. In recent video compression standards, like HEVC, the signs of nonzero transforms coefficients (positive or negative) are coded using one bit per sign. Several methods had been proposed to reduce the average bit rate needed to code those signs, but processes using direct estimation are relatively complex, and yield small gains. One example method is to estimate the signs indirectly, by having the decoder enumerate all combinations of some sign values, apply the inverse transform for each case, and find the one that maximizes smoothness along the borders with known blocks.

This disclosure introduces techniques that extend this approach by employing a new maximum-likelihood (ML) formulation of the problem, which shows that the previous techniques are in fact empiric approximations of the ML technique. Using those new tools, this disclosure describes several new techniques that may improve sign estimation, through better use of statistical properties and techniques. The changes, described in more detail later in this disclosure, are summarized below:
  Theoretical and practical advantages of using the sum of absolute difference (SAD), instead of sums of squares;
  Exploiting information from any set of inverse transform values, and not only those along block boundaries;
  Decisions and entropy coding based on sets of weights matched to each type of block prediction (temporal, spatial, directional, etc.), and also matched to the type of transform;
  The use of second order prediction, using estimates of the variances of errors in pixel predictions, to improve the sign discrimination functions.

In video compression standards, a linear transformation may be applied to the video signal before coding, and the nonzero coefficients have their magnitude coded first, followed by the sign (positive or negative). Several techniques have been proposed to use context-based arithmetic coding to more efficiently encode the magnitudes of transform coefficients, but the advantages of using context coding for the signs have been constrained mostly to wavelet transforms, and in more recent studies on the application for video block transforms, it has been decided that it makes more practical sense to code the signs using one bit, without context coding (corresponding to the bypass mode in the HEVC standard).

There is a technique to avoid, in some cases, coding one sign in a set of coefficients, called "sign data hiding," (SDH) as set forth in "Transform coefficient coding in HEVC" by J. Sole, R. Joshi, N. Nguyen, T. Ji, M. Karczewicz, G. Clare, F. Henry, and A. Dueñas in IEEE Trans. Circuits and Systems for Video Technology, December 2012, pp. 1765-1777, but such techniques may be unrelated to the techniques of this disclosure (i.e., both techniques can be used independently).

In other examples, techniques for guessing the correct sign values include enumerating all combinations of sign values, applying the inverse transform for each case, and then using information from neighboring blocks, or statistical models, to select the combination that produces the block that best matches some additional information about the block being coded.

Figure 9:
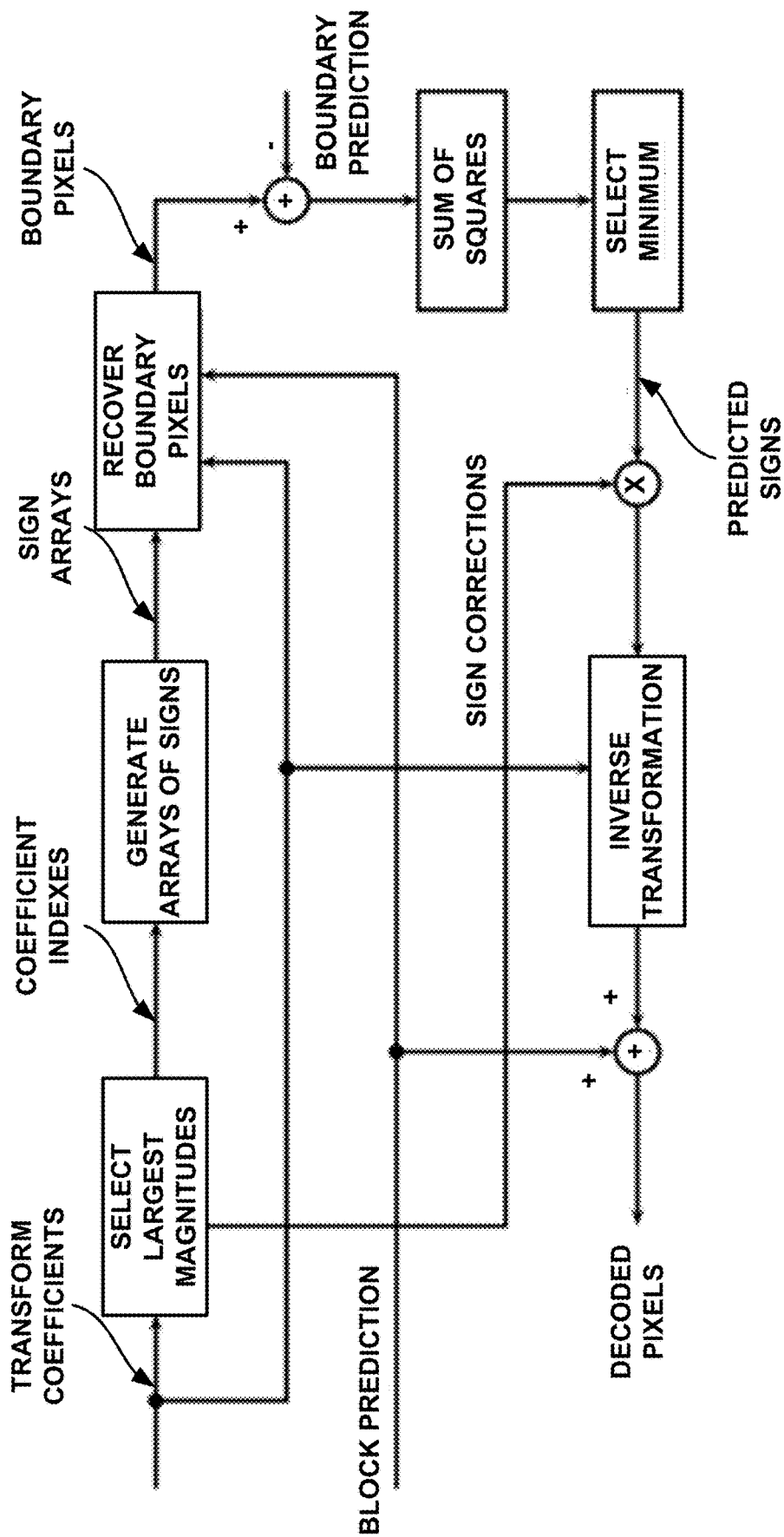
FIG. 9 shows an example of a system for predicting signs at a video decoder.

FIG. 9 shows an example of a system for predicting signs (at a video decoder, such as video decoder 30) by evaluating boundary pixels obtained by applying the inverse transform, using arrays of sign guesses. The application of this idea to image compression was first proposed in "Prediction of signs of DCT coefficients in block-based lossy image compression" by N. Ponomarenko, A. V. Bazhyna, and K. O. Egiazarian, in Proc. SPIE Vol. 6497: Image Process. Algorithms Syst. V, San Jose, Calif., USA, January 2007, and later adapted to video coding in "Coefficient sign bit compression in video coding" by J. Koyama, A. Yamori, K. Kazui, S. Shimada, and A. Nakagawa, in Proc. 29th Picture Coding Symp., Krakow, Poland, May 2012, pp. 385-388, and the basic approach is shown in FIG. 9. It exploits the fact that the probability of the sign being correctly predicted with these enumerative methods grows with the magnitude of its corresponding coefficient. For example, if the magnitude of a coefficient is in a certain range of relatively large values, then the sign of this coefficient can be predicted correctly, on average, in 95% of the cases, and if the coefficient magnitude is relatively small then it can predicted in only 55% percent of the cases.

It is this difference in probabilities that can be exploited by an arithmetic encoder, to reduce the number of bits to code the signs of the transform coefficients with largest magnitudes in a bloc, as proposed by Ponomarenko et al in "Prediction of signs of DCT coefficients in block-based lossy image compression" cited above. This disclosure may address one or more problems with existing techniques for sign estimation. It has been shown that the sign estimation method of FIG. 9 can effectively improve compression, but it is based purely on empirical observations, which are not very useful for designing improved versions, especially in the latest versions of video codecs, which employ many different prediction modes, and residual transforms. For example, if in an effort to improve its efficacy, this disclosure introduces techniques that extend the set of pixels to be tested to the whole block, and use the same prediction that has been used by the encoder, the method will not work.

This happens because the transform is orthogonal, and thus the sum of squares of the possible residual values is independent of the sign of the transform coefficients, and will remain constant for all sets of signs that are tested. When considered that a substantial amount of computation is employed by an encoder to find a very good prediction for the whole block, it is paradoxical that it cannot be used to help estimating the transform coefficient signs. The description below explains that the paradox is not intrinsically related to the estimation problem, but instead it is a consequence of using a suboptimal estimation method.

Thus, the main problem solved by the techniques of this disclosure is how to optimize the technique of estimating transform coefficient signs at the decoder, using advanced statistical methods (instead of ad hoc techniques) for all the different type of prediction modes, and transform types.

The techniques of this disclosure will now be described, starting with an overview of the general approach used. The techniques of this disclosure may solve the problems discussed above considering that, instead of just employing empiric best match criteria to decide the sign values, the techniques of this disclosure consider that this problem can be formulated as a statistical sign estimation problem, and that therefore can be solved with advanced statistical methods.

Figure 10:
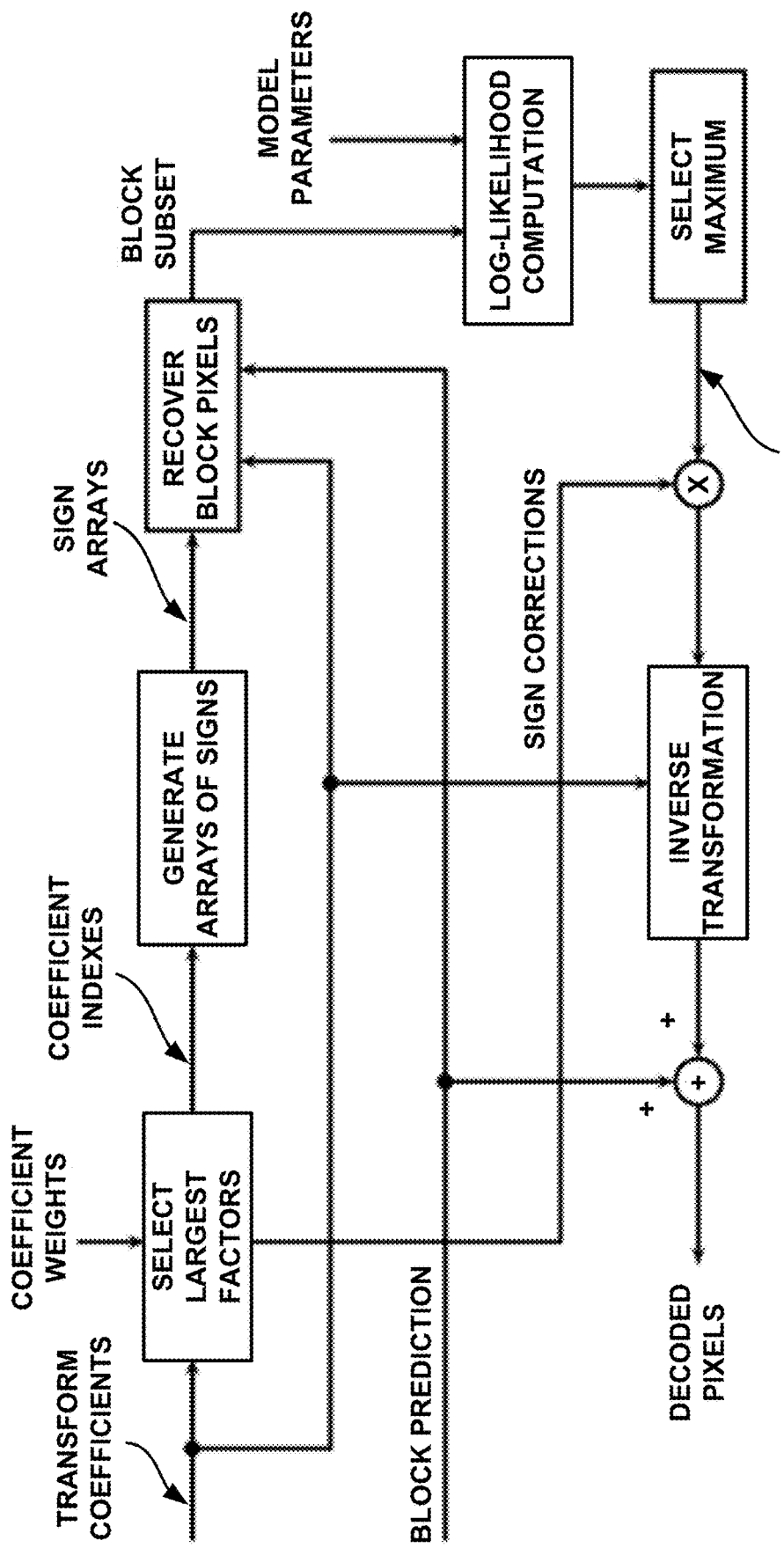
FIG. 10 shows an example of a system for predicting signs at a video decoder using a maximum-likelihood according to the techniques of this disclosure.

Thus, the techniques of this disclosure use the maximum-likelihood approach, and modify the system of FIG. 9 to the one system shown in FIG. 10, where the new elements are marked as "transform coefficients," coefficient weights," "select largest factors," "coefficient indexes," "sign arrays," "recover block pixels," "block subset," "model parameters," "log-likelihood computation," "predicted signs," "sign corrections," and "decoded pixels." The following portion of this disclosure discusses how each of those stages may potentially be improved. This section summarizes, in general terms, how the maximum likelihood technique is applied to the sign estimation problem.

In a block of dimension W×H, symbol s indicates an array of signs that are being tested, use $$c_s[x,y], x=0,1,\ldots,W-1; y=0,1,\ldots,H-1,$$

to indicate the transform coefficients with sign modified according to s, and represent the transformed values as $$v_s[x,y], x=0,1,\ldots,W-1; y=0,1,\ldots,H-1.$$

In addition, define K to represent the knowledge that the decoder has available to estimate the signs (e.g., decoded pixels in neighboring blocks, transform coefficients with known signs, statistical models, etc.).

FIG. 10 shows an example of a system for predicting signs (at a video decoder such as video decoder 30) using a maximum-likelihood according to the techniques of this disclosure.

Looking for array s that, given K, maximizes the conditional likelihood function $$\Lambda_K(s) = \prod_{x=0}^{W-1} \prod_{y=0}^{H-1} p(v_s[x,y] \mid K),$$

where $p(v_s[x, y]|K)$ is the probability density function of the residuals, given decoder knowledge K. Equivalently, the log-likelihood function can be maximized as follows:

$$L_K(s) = -\log(\Lambda_K(s)).$$

The probability distribution functions are commonly defined according to some model for the data. For example, in imaging applications it is known that residual values have probabilities fairly well represented by the Generalized Gaussian Distributions, with probability density function $$p(v) = \frac{\zeta r}{2\sigma \Gamma(1/r)} \exp(-|\zeta[v-\mu]/\sigma|^r),$$

where r, µ, σ represent a shape parameter, the mean, and standard deviation, respectively, and $$\zeta = \sqrt{\frac{\Gamma(3/r)}{\Gamma(1/r)}}.$$

Thus, for the sign estimation problem, to evaluate an array of sign values s, a function that is equal to the log-likelihood, except for constant terms, in the form $$\Phi_K(s) = \sum_{x=0}^{W-1} \sum_{y=0}^{H-1} \left| \frac{v_s[x,y] - \mu_K[x,y]}{\sigma_K[x,y]} \right|^{r_k} \quad (1)$$

After these definitions, how the decoder-side sign estimation technique can be integrated into a complex video coding system can be defined.
1. For each prediction mode and transform type, determine the knowledge that is available after decoding the transform coefficient magnitudes, and define a conditional statistical model for the residuals.
2. Given the statistical models, determine its typical parameters (e.g., from training), and using those parameters design an optimized sign estimation method, that has specific rules for each of the prediction modes, and transform types.
3. Integrate the sign estimation enumeration into the encoding and decoding programs, adding the methods and data to determine the optimization parameters and criteria, which are specific for each prediction mode and transform type.

For example, when using eq. (1), the conditional statistical model is completely defined by the shape, mean, and variance parameters, i.e., $r_K$, $\mu_K[x,y]$, $\sigma_K[x,y]$, which should be also be estimated during encoding and decoding, but with much reduced accuracy, or simplified models. For example, the following criteria may be used:
If the residual distributions are assumed to be Laplacian (shape parameter r=1), then the following can be used:

$$\Phi_K(s) = \sum_{x=0}^{W-1} \sum_{y=0}^{H-1} |w_K[x,y](v_s[x,y] - \mu_K[x,y])|$$

with an array of positional weights $$w_K[x,y] \approx \frac{1}{\sigma_K[x,y]}.$$

This means that in this case the sum of absolute differences (SAD), or the weighted sum of absolute differences (WSAD) should be used for measuring how a set of recovered pixels fits the statistical model.
If the residual distributions are assumed to be Gaussian (shape parameter r=2), then the following can be used:

$$\Phi_K(s) = \sum_{x=0}^{W-1} \sum_{y=0}^{H-1} [w_K[x,y](v_s[x,y] - \mu_K[x,y])]^2$$

In this case the sum of square differences (SSD), or the weighted sum of square differences (WSSD) should be used for measuring the fit to the model. Note that various existing technologies can be considered as an approximation of this last equation, where weights are equal to one (1) if the residual is in the block boundary, and equal to zero otherwise, and the estimated means are equal to the difference between current prediction and pixel values from neighboring blocks. The next sections of this disclosure present some of the details on how the process described above is used, and the ways it is different from existing technologies.

Aspects of this disclosure related to variable weights and spatial support in the log-likelihood estimation will now be described. The previous methods for sign estimation use only pixels along block boundaries to measure discontinuities created by incorrect sign values. This disclosure introduces techniques for using the log-likelihood function to determine which pixels should be included in the sign decision. As indicated by the log-likelihood objective function of eq. (1), the pixels that have smallest estimated variances have more importance in the log-likelihood function. Thus, to reduce the complexity of the estimation, this disclosure describes techniques for using only the pixel values that are expected to have sufficiently small variance. This depends on statistical model, prediction method, transform type, etc., and can be different from pixels at block boundaries.

Figure 11:
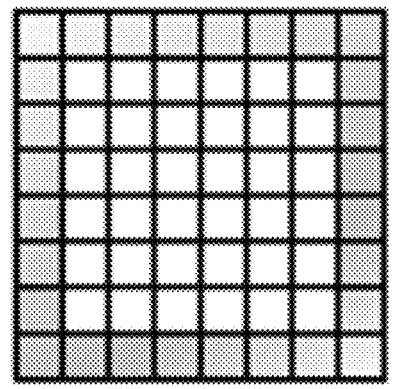
FIG. 11 shows examples of variable weights in a block.
Figure 11:
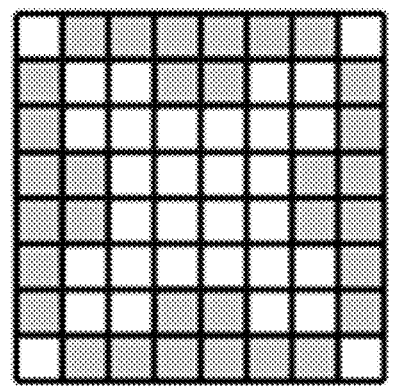
Figure 11:
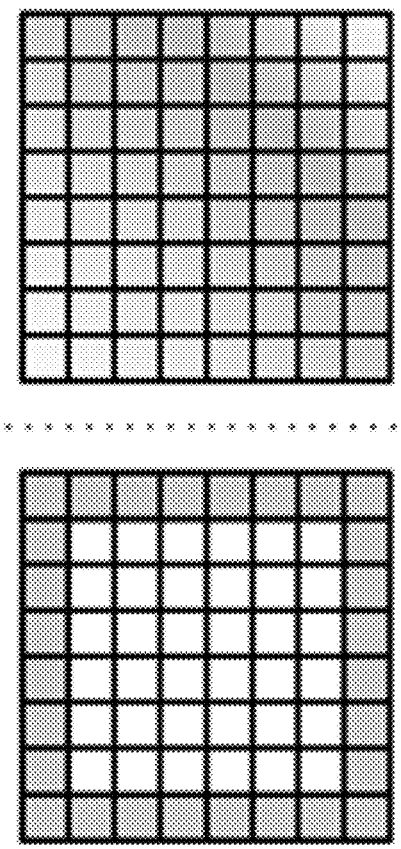

FIG. 11 shows examples of how this can be done. In the figure the gray values are used to indicate the weights used in the log-likelihood, with darker indicating larger, and white indicating zeros equal to zero (and thus, ignored pixels). Existing techniques may use equal weights in boundary pixels, while the techniques of this disclosure include allowing for variable in different positions, depending on the statistics.

FIG. 11 shows examples of how, according to the techniques of this disclosure, variable weights in a block (darker represents larger weights, and white represents weights equal to zero) may exist, depending on the statistical model and complexity considerations.

Aspects of this disclosure related to the determination of likelihood weights from prediction will now be described. One more important difference between existing technologies and the use of variable weights, as described in the last section, is that it also allows for two different modes for using those weights:
The set of weights can be pre-defined for different prediction modes and transform types, and stored in fixed tables.
The set of weights can be compared while encoding and decoding, using an algorithm shared by video encoder 22 and video decoder 30 to estimate statistical parameters, according to the knowledge available to the decoder (K).

Figure 12:
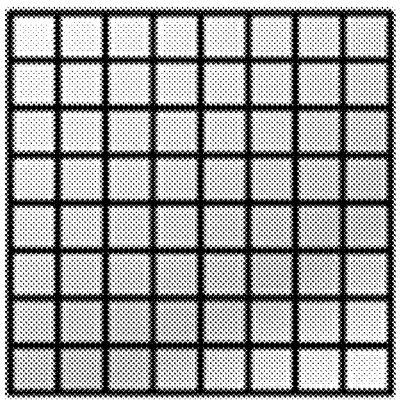
FIG. 12 shows an example of techniques for determining a set of weights for likelihood computation.
Figure 12:
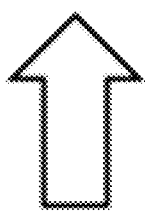
Figure 12:
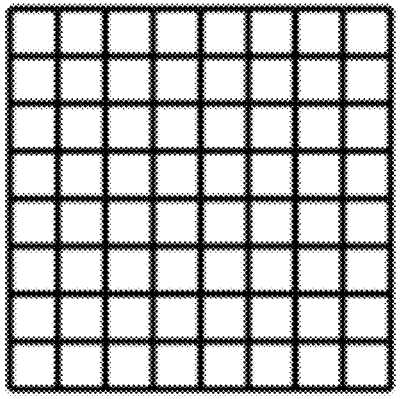
Figure 12:
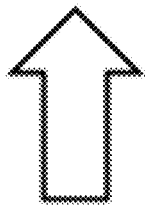
Figure 12:
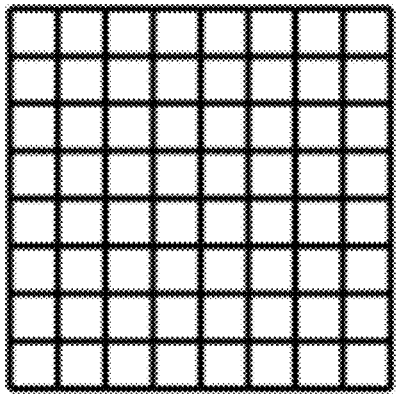

FIG. 12 shows an example of how the encoder and decoder, after analyzing the properties of the block prediction, decide on the set of weights to be used for likelihood computation.

FIG. 12 shows the new process: the block prediction, which is shared by the encoder and decoder, can be used to estimate the variance of residuals, and from those variances the weights to be used in the likelihood function can be derived.

Additional aspects of this disclosure related to transform coefficient selection will now be described. In existing technologies, the set of coefficients that need to have their signs estimated by the decoder is defined solely by the coefficient magnitudes, with the selection of the largest non-zero coefficients.

The effectiveness of estimating the sign of a coefficient does depend on the magnitude, but it also depends on other factors, including:

The set of pixels used for computing the log-likelihood function, and their variances;

The projection of the transform basis functions corresponding to a coefficient on the set of pixels being evaluated.

The combination of these factors may be important because it determines how well the estimation will work. For example, if some transform coefficient has little effect on the pixels where the likelihood function is being evaluated, or it affects only positions where the variance is very large, then the magnitude of that coefficient may be less important for the sign estimation.

Using this property, this disclosure introduces techniques for changing the criteria to select the transform coefficients that have their sign estimated at the decoder with the following.

1. For each prediction mode and transform, define a set of non-negative multipliers $m_K[x,y], x=0,1,\ldots,W-1; y=0,1,\ldots,H-1,$ with magnitude proportional to an estimate of the effect of that coefficient in the likelihood estimation.

2. Select for sign testing the coefficients with largest product of magnitude and multipliers, i.e., instead of only the magnitudes, use the products $m_K[x,y]|c[x,y]|, x=0,1,\ldots,W-1; y=0,1,\ldots,H-1.$ As in the case of weights for the likelihood function, these multipliers can be pre-computed, or derived by the encoder and decoder, based on shared prediction data.

Aspects of this disclosure related to entropy coding will now be described. According to existing technologies, the sign correction bits are entropy coded using contexts that depend on the magnitude of its coefficient. As indicated in the previous sections, the effectiveness of the estimation process depends on the likelihood evaluation, which in turn depends on several other factors.

To potentially improve compression, this disclosure describes techniques for adding additional contexts to the entropy coding stage, including the following:

1. Contexts depending on block size and prediction type, i.e., intra-frame or inter-frame prediction.
2. For intra-frame prediction, adding contexts based on the prediction mode, or some aggregated data based on prediction mode.
3. Adding additional context based on the transform type. More specifically, in the JEM-3.0 codec, the transform applies to a block according to encoded information, according to the Embedded Multiple Transform (EMT) flag, and the Non-separable Secondary Transform (NSST) flags. Thus, to be adaptive to the transform, the context can depend on the EMT and NSST flags, or some aggregated data based on those flags.

Using contexts defined by intervals of the product of the transform coefficient magnitude, and its corresponding multiplier, as defined in the previous section.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder (e.g., a video encoding device or a video decoding device). Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, processing circuitry (e.g., fixed function circuitry, programmable processing circuitry, or any combination of fixed function circuitry and programmable processing circuitry), application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   identifying a set of pre-stored residual samples in a pre-stored portion of the video data;
   assigning a first absolute value to a first transform coefficient of each pre-stored residual sample of the set of pre-stored residual samples;
   assigning a second absolute value to all remaining transform coefficients of each pre-stored residual sample of the set of pre-stored residual samples except for the respective first transform coefficients that are assigned the first absolute value, the second absolute value being different from the first absolute value;
   applying an inverse transform to each pre-stored residual sample of the set of pre-stored residual samples to form a set of dequantized reconstructed residual samples, wherein each pre-stored residual sample of the set of pre-stored residual samples comprises a dequantized transform coefficient block;
   combining the set of pre-stored residual samples to form a combination of pre-stored residual samples;
   applying a first sign combination to transform coefficients of the combination of pre-stored residual samples to obtain a first hypothesis reconstruction with respect to a current block of the video data;
   applying a second sign combination to the transform coefficients of the combination of pre-stored residual samples to obtain a second hypothesis reconstruction with respect to the current block of the video data;
   deriving respective cost functions with respect to the first hypothesis reconstruction and the second hypothesis reconstruction;
   comparing the respective derived cost functions;
   selecting, based on the comparison, either the first hypothesis reconstruction or the second hypothesis reconstruction; and
   coding the current block using a sign prediction associated with the selected one of the first hypothesis reconstruction or the second hypothesis reconstruction.

2. The method of claim 1, wherein the first absolute value is one (1), and wherein the second absolute value is zero (0).

3. The method of claim 1, further comprising:
   scaling each dequantized residual sample of the set of dequantized residual samples using a dequantized value associated with each of the first transform coefficients; and
   reconstructing the current block using the set of scaled dequantized residual samples.

4. The method of claim 1, wherein one or more pre-stored residual samples of the identified set of pre-stored residual samples are stored at a fractional precision in the stored portion of the video data.

5. The method of claim 1, further comprising scaling each pre-stored residual sample of the identified set of pre-stored residual samples using a pre-defined factor.

6. The method of claim 1, further comprising clipping each pre-stored residual sample of the identified set of pre-stored residual samples using a pre-defined factor such that each clipped pre-stored residual sample can be represented using four (4) bits or less of data.

7. The method of claim 1, wherein combining the set of pre-stored residual samples to form the combination of pre-stored residual samples comprises performing a linear combination of the set of pre-stored residual samples to form a linear combination of pre-stored residual samples.

8. The method of claim 7, wherein performing the linear combination of the set of pre-stored residual samples comprises calculating a weighted sum of the set of pre-stored residual samples, at least in part by assigning a respective weight to each pre-stored residual sample of the set of pre-stored residual samples.

9. The method of claim 1, wherein combining the set of pre-stored residual samples to form the combination of pre-stored residual samples comprises merging the set of pre-stored residual samples to form a single merged residual block, the method further comprising:
   overwriting the set of pre-stored residual samples with the single merged residual block in a memory device.

10. The method of claim 1, further comprising:
    deriving a single residual block using one or more pre-stored residual samples of the identified set of pre-stored residual samples
    overwriting the set of pre-stored residual samples with the derived single residual block in a memory device.

11. The method of claim 1, wherein the stored portion of the video data including the set of pre-stored residual samples is stored to a first memory device, the method further comprising:
    loading one or more pre-stored residual samples of the set of pre-stored residual samples from the first memory device to a second memory device on one of a once-per picture basis or a once-per largest coding unit (LCU) basis.

12. The method of claim 1, wherein coding the video data comprises decoding encoded video data, wherein the current block is an encoded block of the encoded video data, and wherein coding the current block comprises reconstructing the encoded block.

13. A device for coding video data, the device comprising:
a video data memory; and
processing circuitry coupled to the video data memory, the processing circuitry being configured to:
identify a set of pre-stored residual samples in a portion of the video data that is pre-stored to the video data memory;
assign a first absolute value to a first transform coefficient of each pre-stored residual sample of the set of pre-stored residual samples;
assign a second absolute value to all remaining transform coefficients of each pre-stored residual sample of the set of pre-stored residual samples except for the respective first transform coefficients that are assigned the first absolute value, the second absolute value being different from the first absolute value;
apply an inverse transform to each pre-stored residual sample of the set of pre-stored residual samples to form a set of dequantized reconstructed residual samples, wherein each pre-stored residual sample of the set of pre-stored residual samples comprises a dequantized transform coefficient block;
combine the set of pre-stored residual samples to form a combination of pre-stored residual samples;
apply a first sign combination to transform coefficients of the combination of pre-stored residual samples to obtain a first hypothesis reconstruction with respect to a current block of the video data;
apply a second sign combination to the transform coefficients of the combination of pre-stored residual samples to obtain a second hypothesis reconstruction with respect to the current block of the video data;
derive respective cost functions with respect to the first hypothesis reconstruction and the second hypothesis reconstruction;
compare the respective derived cost functions;
select, based on the comparison, either the first hypothesis reconstruction or the second hypothesis reconstruction; and
code the current block using a sign prediction associated with the selected one of the first hypothesis reconstruction or the second hypothesis reconstruction.

14. The device of claim 13, wherein the first absolute value is one (1), and wherein the second absolute value is zero (0).

15. The device of claim 13, wherein the processing circuitry is further configured to:
scale each dequantized residual sample of the set of dequantized residual samples using a dequantized value associated with each of the first transform coefficients; and
reconstruct the current block using the set of scaled dequantized residual samples.

16. The device of claim 13, wherein one or more pre-stored residual samples of the identified set of pre-stored residual samples are stored at a fractional precision in the portion of the video data stored to the video data memory.

17. The device of claim 13, wherein the processing circuitry is further configured to scale each pre-stored residual sample of the identified set of pre-stored residual samples using a pre-defined factor.

18. The device of claim 13, wherein the processing circuitry is further configured to clip each pre-stored residual sample of the identified set of pre-stored residual samples using a pre-defined factor such that each clipped pre-stored residual sample can be represented using four (4) bits or less of data.

19. The device of claim 13, wherein to combine the set of pre-stored residual samples to form the combination of pre-stored residual samples, the processing circuitry is configured to perform a linear combination of the set of pre-stored residual samples to form a linear combination of residual samples pre-stored to the video data memory.

20. The device of claim 19, wherein to perform the linear combination of the set of pre-stored residual samples, the processing circuitry is configured to calculate a weighted sum of the set of pre-stored residual samples, at least in part by assigning a respective weight to each pre-stored residual sample of the set of pre-stored residual samples.

21. The device of claim 13, wherein to combine the set of pre-stored residual samples to form the combination of pre-stored residual samples, the processing circuitry is configured to merge the set of pre-stored residual samples to form a single merged residual block, and wherein the processing circuitry is further configured to overwrite the set of pre-stored residual samples with the single merged residual block in the video data memory.

22. The device of claim 13, wherein the processing circuitry is further configured to:
derive a single residual block using one or more pre-stored residual samples of the identified set of pre-stored residual samples
overwrite the set of pre-stored residual samples with the derived single residual block in the video data memory.

23. The device of claim 13,
wherein to code the video data, the processing circuitry is configured to decode encoded video data,
wherein the current block is an encoded block of the encoded video data, and
wherein to code the current block, the processing circuitry is configured to reconstruct the encoded block.

24. An apparatus for coding video data, the apparatus comprising:
means for identifying a set of pre-stored residual samples in a pre-stored portion of the video data;
means for assigning a first absolute value to a first transform coefficient of each pre-stored residual sample of the set of pre-stored residual samples;
means for assigning a second absolute value to all remaining transform coefficients of each pre-stored residual sample of the set of pre-stored residual samples except for the respective first transform coefficients that are assigned the first absolute value, the second absolute value being different from the first absolute value;
means for applying an inverse transform to each pre-stored residual sample of the set of pre-stored residual samples to form a set of dequantized reconstructed residual samples, wherein each pre-stored residual sample of the set of pre-stored residual samples comprises a dequantized transform coefficient block;
means for combining the set of pre-stored residual samples to form a combination of pre-stored residual samples;
means for applying a first sign combination to transform coefficients of the combination of pre-stored residual samples to obtain a first hypothesis reconstruction with respect to a current block of the video data;
means for applying a second sign combination to the transform coefficients of the combination of pre-stored residual samples to obtain a second hypothesis reconstruction with respect to the current block of the video data;
means for deriving respective cost functions with respect to the first hypothesis reconstruction and the second hypothesis reconstruction;
means for comparing the respective derived cost functions;
means for selecting, based on the comparison, either the first hypothesis reconstruction or the second hypothesis reconstruction; and
means for coding the current block using a sign prediction associated with the selected one of the first hypothesis reconstruction or the second hypothesis reconstruction.

\* \* \* \* \*